United States Patent
Hopkins

(10) Patent No.: US 9,191,767 B2
(45) Date of Patent: Nov. 17, 2015

(54) DIRECTIONAL SOUND APPARATUS, METHOD GRAPHICAL USER INTERFACE AND SOFTWARE

(71) Applicants: Sony Corporation, Minato-ku (JP); Sony Europe Limited, Weybridge (GB)

(72) Inventor: Huw Hopkins, Basingstoke (GB)

(73) Assignees: Sony Corporation, Tokyo (JP); Sony Europe Limited, Weybridge (GB)

( * ) Notice: Subject to any disclaimer, the term of this patent is extended or adjusted under 35 U.S.C. 154(b) by 183 days.

(21) Appl. No.: 14/045,275

(22) Filed: Oct. 3, 2013

(65) Prior Publication Data

US 2014/0112506 A1  Apr. 24, 2014

(30) Foreign Application Priority Data

Oct. 19, 2012 (GB) .................................. 1218826.4

(51) Int. Cl.
| | |
|---|---|
| *H04S 7/00* | (2006.01) |
| *H04N 21/4223* | (2011.01) |
| *H04N 21/485* | (2011.01) |
| *H04N 21/81* | (2011.01) |

(52) U.S. Cl.
CPC ............ *H04S 7/303* (2013.01); *H04N 21/4223* (2013.01); *H04N 21/4852* (2013.01); *H04N 21/8106* (2013.01)

(58) Field of Classification Search
CPC . H04S 7/303; H04S 2400/11; H04S 2420/01; H04S 7/302
USPC .......................................................... 381/306
See application file for complete search history.

(56) References Cited

U.S. PATENT DOCUMENTS

| | | | |
|---|---|---|---|
| 7,756,275 B2 * | 7/2010 | Crundwell et al. ............. 381/59 |
| 8,483,414 B2 * | 7/2013 | Kondo et al. ................. 381/306 |
| 8,553,894 B2 * | 10/2013 | Berardi et al. .................. 381/17 |
| 8,588,440 B2 * | 11/2013 | Koppens et al. .............. 381/310 |
| 8,873,778 B2 * | 10/2014 | Nakano ......................... 381/303 |
| 2009/0304205 A1 | 12/2009 | Hardacker et al. | |

(Continued)

FOREIGN PATENT DOCUMENTS

GB  2460219 A  11/2009

OTHER PUBLICATIONS

U.S. Appl. No. 14/045,211, filed Oct. 3,2013, Difrancesco, et al.
Extended European Search Report issued Jul. 23, 2014 in Patent Application No. 13186015.7.
Great Britain Search Report issued May 1, 2013, in Great Britain Application No. 1218826.4 filed Oct. 19, 2012.

(Continued)

*Primary Examiner* — Mark Blouin
(74) *Attorney, Agent, or Firm* — Oblon, McClelland, Maier & Neustadt, L.L.P.

(57) ABSTRACT

A directional sound apparatus is described. The apparatus comprises a receiver operable to receive audio data associated with a video stream and to receive, over a network, ancillary audio data containing supplemental audio data associated with the video stream; a storage device operable to store a plurality of profiles, each profile being associated with a different user of the sound system and defining the audio to be provided to the user; a user location device defining a first positional location of a first user having a stored profile; an audio output operable to connect to a plurality of speakers; and an audio controller operable to control the audio output to the plurality of speakers to simultaneously provide the audio data and the supplemental audio data to the first user at the first positional location and said audio data to a second user located at a second, different, positional location.

20 Claims, 18 Drawing Sheets

(56) References Cited

U.S. PATENT DOCUMENTS

| | | |
|---|---|---|
| 2010/0150361 A1 | 6/2010 | Kim et al. |
| 2011/0164175 A1 | 7/2011 | Chung et al. |
| 2012/0124456 A1 | 5/2012 | Perez et al. |

OTHER PUBLICATIONS

Liang Wang, et al., "Face Tracking Using Motion-Guided Dynamic Template Matching", ACCV2002: The 5$^{th}$ Asian Conference on Computer Vision, Jan. 23-25, 2002, Melbourne Australia, 6 pages.

* cited by examiner

DIRECTIONAL SOUND APPARATUS, METHOD GRAPHICAL USER INTERFACE AND SOFTWARE

BACKGROUND

1. Field of the Disclosure

The present disclosure relates to a directional sound apparatus.

2. Description of the Related Art

The "background" description provided herein is for the purpose of generally presenting the context of the disclosure. Work of the presently named inventors, to the extent it is described in the background section, as well as aspects of the description which may not otherwise qualify as prior art at the time of filing, are neither expressly or impliedly admitted as prior art against the present disclosure.

Typically, in many homes, a television and any audio equipment associated with the television, is located in the main living area. This allows families to sit together and enjoy watching a television program or film together.

However, in many families, people desire different audio experiences when watching a television program. For example, one member of a family may have a visual impairment. Therefore, it may be desirable for such a user to have an audio description of the scene provided to them. In the case where other family members do not have such a visual impairment, such an audio description is not necessary and in some instances may detract from their enjoyment of the television program.

It is an aim of embodiments to address this problem.

SUMMARY

There is provided a directional sound apparatus, comprising a receiver circuitry configured to receive audio data associated with a video stream and to receive, over a network, ancillary audio data containing supplemental audio data associated with the video stream; a storage device circuitry configured to store a plurality of profiles, each profile being associated with a different user of the sound system and defining the audio to be provided to the user; a user location device defining a first positional location of a first user having a stored profile; an audio output circuitry configured to connect to a plurality of speakers; and an audio controller circuitry configured to control the audio output to the plurality of speakers to simultaneously provide the audio data and the supplemental audio data to the first user at the first positional location and said audio data to a second user located at a second, different, positional location.

This allows a user who has a specific accessibility requirement to be provided with the accessibility option.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DESCRIPTION OF THE EMBODIMENTS

Figure 1:
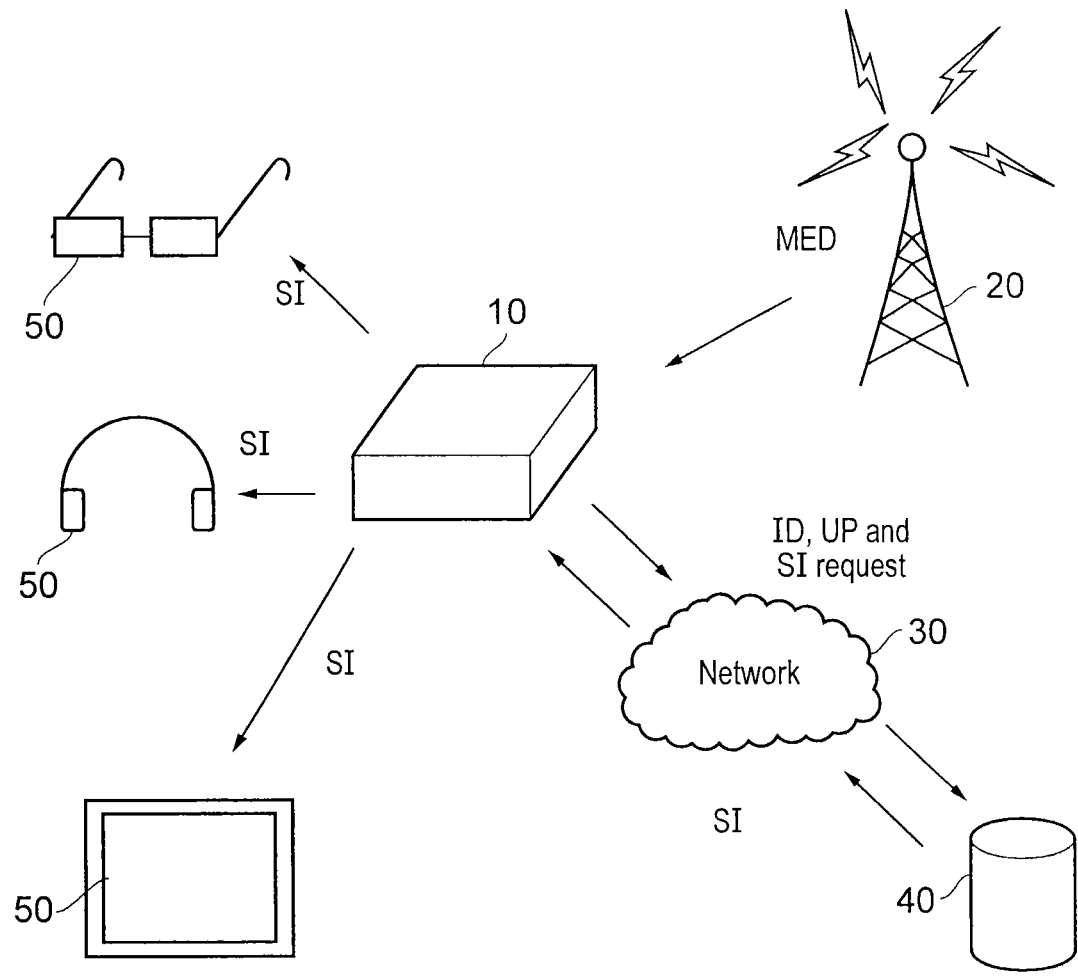
FIG. 1 shows a system for transmitting supplementary information to a personal user device according to embodiments.

There is provided a directional sound apparatus, comprising a receiver circuitry configured to receive audio data associated with a video stream and to receive, over a network, ancillary audio data containing supplemental audio data associated with the video stream; a storage device circuitry configured to store a plurality of profiles, each profile being associated with a different user of the sound system and defining the audio to be provided to the user; a user location device defining a first positional location of a first user having a stored profile; an audio output circuitry configured to connect to a plurality of speakers; and an audio controller circuitry configured to control the audio output to the plurality of speakers to simultaneously provide the audio data and the supplemental audio data to the first user at the first positional location and said audio data to a second user located at a second, different, positional location.

This allows a user who has a specific accessibility requirement to be provided with the accessibility option.

The storage device may be operable to store a face image with each profile and the user location device may be operable to be connected to a camera, wherein the user location device may be operable to receive a captured image including the face of the first user from the camera and the user location device is further operable to detect the face of the first user in the captured image and to define the first positional information based upon the position of the detected face of the first user.

The stored face image of the first user may be stored in association with at least one parameter of the camera and reference positional information defining the position of the first user when the stored face image was captured.

The supplemental audio data may be an audio descriptor or contains dialogue in a language different to the dialogue in the audio data.

The user location device may be operable to detect from the image a physical action performed by the first user, the performance of the action indicating that the audio controller should commence control of the audio output to the plurality of speakers.

The user location device may be operable to monitor an area in the image surrounding the detected physical action, and in response to a further physical action, the audio controller is operable to provide the audio signal to both the first and second user.

The directional sound apparatus may comprise a user input device operable to receive a user profile for storage in the storage device.

The user location device may be operable at registration of the user with the directional sound apparatus, to determine the positional location of the user being registered, and the storage device is operable to store the positional location of the user being registered in association with the user profile being registered.

A graphical user interface may be provided for the directional sound apparatus, the graphical user interface being displayable on a screen and comprising: a display region defining a plurality of accessibility options, wherein the user selects one or more of the displayed accessibility options and, in response to the user selection, the storage device is operable to store the selected accessibility option in association with the user profile.

There is also provided a user profile generating device, comprising an input device operable to receive voice commands from a user; an output device operable to provide audible instructions to a user, and a memory operable to store a user profile, wherein the memory is operable to store a plurality of accessibility options and the output device is operable to audibly present each of the plurality of accessibility options, and the accessibility option is associated with the user profile upon receipt of a voice command from the user.

There is also provided a method, comprising receiving audio data associated with a video stream;

receiving, over a network, ancillary audio data containing supplemental audio data associated with the video stream; storing a plurality of profiles, each profile being associated with a different user of the sound system and defining the audio to be provided to the user; defining a first positional location of a first user having a stored profile; controlling the audio output to a plurality of speakers to simultaneously provide the audio data and the supplemental audio data to the first user at the first positional location and said audio data to a second user located at a second, different, positional location.

The method may also comprise storing a face image with each profile; receiving a captured image including the face of the first user from a camera and detecting the face of the first user in the captured image and defining the first positional information based upon the position of the detected face of the first user.

The stored face image of the first user may be stored in association with at least one parameter of the camera and reference positional information defining the position of the first user when the stored face image was captured.

The supplemental audio data may be an audio descriptor or contains dialogue in a language different to the dialogue in the audio data.

The method may comprise detecting from the image a physical action performed by the first user, the performance of the action indicating that control should commence of the audio output to the plurality of speakers.

The method may comprise monitoring an area in the image surrounding the detected physical action, and in response to a further physical action; and providing the audio signal to both the first and second user.

The method may comprise receiving a user profile for storage in the storage device.

The method may comprise determining, at registration of the user with the directional sound apparatus, the positional location of the user being registered, and storing the positional location of the user being registered in association with the user profile being registered.

There is also provided a computer program comprising computer readable instructions which, when loaded onto a computer, configure the computer to perform the method.

There is also provided a storage medium configured to store the computer program therein or thereon.

Referring now to the drawings, wherein like reference numerals designate identical or corresponding parts throughout the several views.

Overview of Supplementary Information Transmission to a Personal User Device

FIG. 1 schematically illustrates a system comprising a device 10 for providing a media content item (such as a television program, a movie, or any other uniquely identifiable audio/video material) to a user according to a first embodiment of the present disclosure. In this particular example, the device 10 is a standalone device. However, the device 10 could also be comprised within a television (for example, a "Smart TV"), set-top box, optical disc player, games console, personal computer, or any other suitable audio/visual (AV) device.

The device 10 receives a media content item via a media content item data stream MED. In this particular example, the data stream MED is transmitted from a broadcast transmitter 20. However, this need not necessarily be the case. The device could also receive the data stream MED over a telecommunications network such as the internet or a cellular communication network, or from the reproduction of a data stream recorded on a recording medium such as a hard disk drive, solid state memory or optical disc, for example.

Included in the data stream MED is identifying data ID which identifies the media content item being carried by the data stream MED. For example, if the media content item is a movie, then the identifying data ID specifies exactly which movie it is (for example, by specifying the movie name and year). Similarly, if the media content item is an episode of a television show, then the identifying data ID specifies exactly which episode of that television show it is (for example, by specifying the television show name and year, the series number and the episode number). In other words, the identifying data uniquely identifies the media content item. As will be explained later on, this identifying data ID allows supplementary information specific to the particular media content item received to be sent to the device 10. As non-limiting examples, the identifying data ID may include a Universal Media Identifier (UMID) or the Entertainment Identifier Registry (EIDR) or the like.

The device 10 is able to store user profile information UP. The user profile information UP is created using the methods described later with reference to FIG. 3 and under the heading "Creation of User Profile". However, at this stage, it is noted that the user profile information specifies, for a particular user of the device 10, the type or types of supplementary information required by the user. For example, if a particular user is visually impaired, then user profile information UP is created for that particular user specifying that the user requires an audio description as supplementary information. Similarly, if a particular user has a hearing impairment, then the user profile information UP is created for that particular user specifying that the user requires subtitles as supplementary information.

Once the device 10 has both the identifying data ID for a received media content item and the user profile information UP for a particular user, the device 10 transmits the identifying data ID, the user profile information UP and a request for supplementary information related to the media content item to a server 40 over a network 30. The network 30 can be any suitable type of telecommunications network through which the device 10 and server 40 may communicate. For example, the network 30 could be the internet.

The server 40 provides the supplementary information to the device 10. On the basis of the user profile, the device 10 supplies the supplementary information to a personal user device 50 attributed to the user for whom the supplementary information is intended. The personal user device 50 must be suitable for providing the supplementary information SI to the user. Examples of personal user devices suitable for providing visual supplementary information SI to the user (such as subtitles or closed captioning) include a head-mountable display (HMD), a personal computer, a tablet computer or a mobile phone (for example, a "smartphone"), or the like. Any one of these devices may also be coupled with a pair of headphones or the like so as to enable audio supplementary information SI (such as an audio description or additional dialogue) to be provided to the user. Alternatively, if it is only audio supplementary information SI that is required, then a pair of headphones or the like may be directly connected to the device 10 as a personal user device 50.

The process of supplying the supplementary information is explained in detail later with reference to FIGS. 9A-9B.

Overview of Supplementary Information Transmission Over a Speaker System

The above example describes providing supplementary information to a user's personal device. However, in other circumstances, where the supplementary information is audio information, such as dubbing or audio descriptors, the supplementary information could be provided to a user watching a media content item without a personal device.

Figure 2:
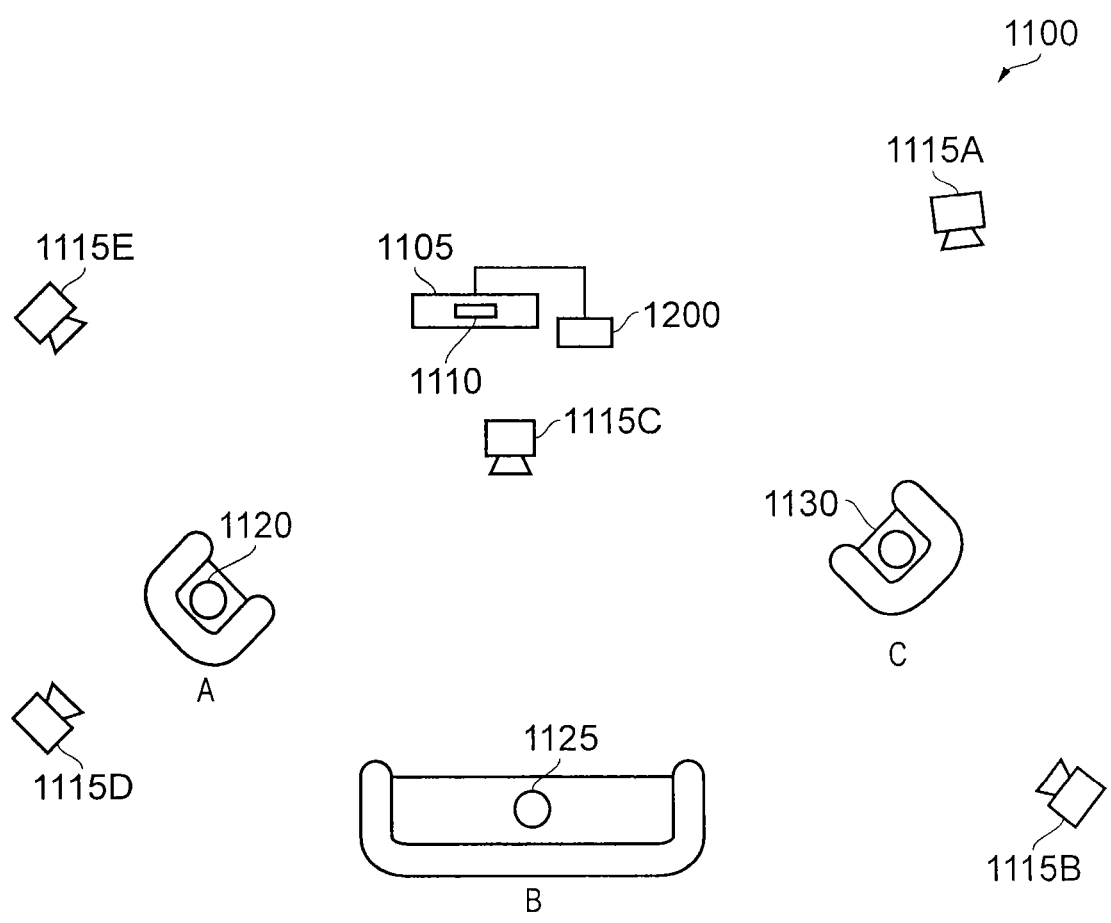
FIG. 2 shows a system for transmitting supplementary audio data over a speaker system according to embodiments.

Referring to FIG. 2, a system 1100 according to a second embodiment of the present disclosure is described. In this system 1100, a directional sound apparatus 1200 is connected to a television 1105. The television may be a Liquid Crystal Display (LCD) television such as a Sony BRAVIA® television. Also connected to the directional sound apparatus 1200 is a camera 1110. In embodiments the camera 1110 may be a Sony PlayStation Eye® camera. However, any type of camera that can capture at least the faces of users located in the room may be used. The camera 1110 is, in this figure, mounted to the top of the television 1105 in order to more easily capture the faces of the users. Of course, the camera 1110 may be located anywhere around the room.

Located at different positions around the room are several speakers 1115A-1115E. These speakers are designed to reproduce audio provided by television programs. These speakers may consist of one or more sub-woofer and several satellite speakers which are located around the room. The arrangement of the speakers is similar to a surround sound system where each of the speakers is controlled independently of one another. In other words, the signal provided to one speaker may be different to that provided to another speaker. The speakers may be connected to the directional sound apparatus 1200 using wires or may be connected to the directional sound apparatus 1200 wirelessly. In the example shown in FIG. 2, the speakers 1115A-1115E are connected wirelessly to the directional sound apparatus 1200.

Located within the room are several users 1120, 1125, 1130. The users are located at various positions around the room A, B and C respectively. Specifically, a first user 1120 is located at position A, a second user 1125 is located at position B and a third user 1130 is located at position C. Although only three users are shown in FIG. 2, any number of users may be located in the room.

As will be discussed in detail with reference to FIGS. 12-14, the directional sound apparatus 1200 is operable to control the audio output to the speakers 1115A-1115E to simultaneously provide audio data and supplementary audio data to a first user in a first positional location and the audio data to a second user located at a second, different, positional location.

Creation of User Profile

In both examples discussed above, a user profile is generated which defines the supplementary information to be provided to a user. The production of a user profile will now be described with reference to FIGS. 3 to 7. A user profile is the set of all user profile information UP associated with a particular user.

Figure 3:
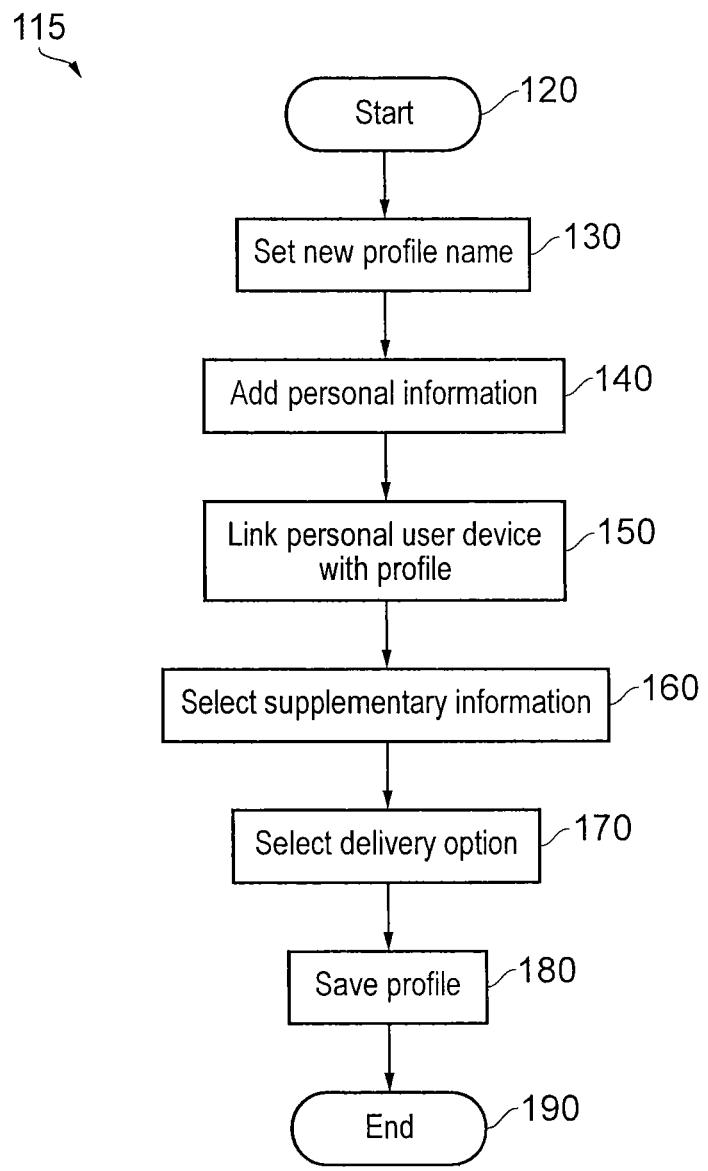
FIG. 3 shows a flow chart explaining the process of creating a user profile for transmitting supplementary information to a personal user device.

FIG. 3 shows a flow chart 115 explaining an example process for creating a user profile in some embodiments, in which supplementary information is transmitted to a personal user device. A user profile is created on the memory 70 of the device 10 using a user controller (such as a remote controller) associated with the device 10 (not shown), for example.

The user profile creation process starts at step 120, following a command issued by the user to begin the user profile creation process. At step 130, a name of the user profile is entered by the user. The user profile name is used to distinguish the new user profile from all other existing user profiles, and must hence be different to each of the user profile names used for existing user profiles.

In some embodiments, it is possible for the user profile to be stored on a server in addition to being stored on the memory 70 of the device 10. Such an arrangement allows the new user profile to be used with many different devices, rather than just the single device 10 (provided that a device is able to access the server on which the user profile is stored). In this case, the user profile name must be unique compared to all other user profile names stored on the server in order for it to be identifiable. A password associated with the new user profile can also be set up, so as to ensure that access to the new user profile is restricted only to the user who created it.

It is also possible that the name of a new user profile can be linked to, for instance, an existing username and password for a different network-based service, such as an email service, social networking service or entertainment service. This means that a user does not have to create a unique new user profile name, since the new user profile will automatically be associated with an existing unique user account. This improves the convenience for the user.

At step 140, the user is able to enter personal user information which is to be associated with the new user profile. This personal information could include information which the device 10 can then use to suggest types of supplementary information SI which might be useful to the user. For example, a visually impaired user could tell the device 10 that they are visually impaired. In a later stage of the user profile creation process (to be explained later on), the device 10 can then suggest the types of supplementary information (such as an audio description) which might be useful to that particular user and which may thus be associated with the new user profile.

At step 150, the new user profile is linked to a personal user device 50 to which acquired supplementary information SI may be transmitted by the SI transmitter 100. Such an arrangement requires a connection between the device 10 and the personal user device 50 to first be established. The device 10 can be made to connect with a particular personal device 50 using any suitable wired or wireless method. Suitable wireless transmission methods include Bluetooth, infrared (IR), radio frequency (RF) or optical transmission methods. Alternatively, if the device 10 and personal device 50 are both part of a telecommunications network such as a local area network (LAN), then the supplementary information SI may be transmitted from the device 10 to the personal device 50 using this network.

The linking of the new user profile to the personal user device 50 may then be carried out via any suitable method known in the art.

For example, if the personal user device 50 is to be wirelessly linked to the device 10 by, for instance, a direct wireless connection such as a Bluetooth, IR or RF connection, then the device 10 can be set to a mode in which it is able to detect a synchronisation signal of a predetermined format over this direct wireless connection. The user may then issue a command on their chosen personal user device 50 to send such a synchronisation signal to the device 10, the synchronisation signal comprising information to uniquely identify the chosen personal user device. Following the receipt of the synchronisation signal, the device 10 establishes a connection with the chosen personal user device 50.

Alternatively, the personal user device 50 may be wirelessly linked to the device 10 by an indirect wireless connection, such as via a wireless LAN. In this case, if both the device 10 and the chosen personal user device 50 are connected to the same wireless LAN, the user can issue a command to the device 10 to compile a list of all devices on the wireless LAN. Each of the devices will be uniquely identifiable by, for example, an Internet Protocol (IP) or Media Access Control (MAC) address. The user may then select the chosen personal user device 50 from the compiled list. A request signal can then be transmitted from the device 10 to the chosen personal user device, the request signal indicating to the chosen personal user device that the user wishes a connection between the chosen personal user device and the device 10 to be established. The user may then command the chosen personal user device to transmit an approval signal to the device 10, the approval signal indicating to the device 10 that the chosen personal user device approves the request. Following the receipt of the approval signal, the device 10 establishes a connection with the chosen personal user device 50.

In general, the information to uniquely identify the chosen personal user device 50 could take a variety of formats. In some embodiments, it could take a non-standard format which only needs to be known to the device 10 and compatible personal user devices 50. This might be a suitable option for, for example, personal user devices 50 which have been especially designed for exclusive use with the device 10 (such as a specialist HMD), and which connect to the device 10 using a direct wireless connection such as a Bluetooth, IR or RF connection. In other embodiments, the information could take a more widely known format, such as an IP or MAC address of the personal user device 50. This might be a suitable option for multi-use personal user devices such as personal computers, tablet computers or mobile phones, which are likely to connect to the device 10 using an indirect wireless connection such as via a LAN.

For personal user devices designed specifically to be used in the present disclosure (such as a particular type of head-mountable display), the synchronisation or approval signal could be issued by, for example, pressing a physical synchronisation button on the personal user device. For multifunctional personal user devices not specifically designed to be used in embodiments of the present disclosure (such as personal computers, tablet computers or mobile phones), these devices comprise software which instructs the device to transmit the synchronisation or approval signal in response to a command issued by the user. This software could be downloaded to such a device by the user in order to make it compatible with embodiments of the present disclosure.

Once a connection between the device 10 and personal user device 50 has been established, the new user profile is linked to the personal user device. This is achieved by including the information to uniquely identify the personal user device 50 as part of the new user profile.

At step 160, the user chooses the type of supplementary information SI that they wish to receive. The user can select the supplementary information SI they wish to receive for each type of media content item that can be received by the device 10. For example, if the user is visually impaired, then they may select an audio description as supplementary information for movies and television shows, but select no supplementary information for audio-based media content items such as music or radio shows.

Depending on the personal information entered onto the device 10 at step 140, the device 10 may also make some default choices regarding the supplementary information SI. For example, if the user tells the device during step 140 that they are visually impaired, then the device 10 could automatically make some predetermined supplementary information choices based on the needs of a typical visually impaired person. For instance, the device could automatically select an audio description as supplementary information for movies and television shows, but select no supplementary information for audio-based media content items such as music or radio shows. Advantageously, this improves the convenience for the user, since many of the supplementary information choices that are desirable to them may have already been selected. Even when some supplementary choices have been made automatically however, the user may additionally select or deselect particular supplementary information choices manually, in accordance with their personal preferences.

At step 170, the user selects a supplementary information SI delivery option for the new user profile. The supplementary information delivery option specifies when supplementary information chosen by the user in step 160 is transmitted to the personal user device linked to the new user profile.

One example of a delivery option is to start transmitting available supplementary information SI to the personal user device 50 once the user issues a command to either the device 10 or the personal user device 50 that they require the supplementary information SI.

If the command is issued to the device 10, then the device 10 transmits a test signal to the personal user device 50 linked to the user profile to ensure that the personal user device 50 is available to receive the supplementary information SI. The availability of the personal user device 50 depends on, for example, whether it is within range of the device 10, whether it has sufficient battery life (if applicable) and whether the appropriate software application is running on it so as to allow it to receive the supplementary information SI (if applicable). If the personal user device 50 is available to receive the supplementary information, it sends a signal to the device 10 in response to the test signal in order to indicate that it is available. The device 10 then starts transmitting the supplementary information SI to the personal user device 50. Alternatively, if the personal user device 50 is not available to receive the supplementary information SI, it sends a different signal to the device 10 in response to the test signal in order to indicate that it is not available. The device 10 then returns an error message to the user. An error message is also sent to the user if the device 10 does not detect any form of response signal from the personal user device 50 within a predetermined time period (such as 5, 10 or 20 seconds).

On the other hand, if the command is issued to the personal user device 50, then, if the personal user device 50 is available to receive the supplementary information SI, it transmits a signal to the device 10. The device 10 then starts transmitting the supplementary information SI to the personal user device 50 in response to receiving this signal. Alternatively, if the personal user device 50 is not available to receive the supplementary information SI, or if there is no response detected from the device 10 within a predetermined time period, then the personal user device 50 returns an error message to the user.

Once the user has selected their preferred delivery option for the supplementary information SI, the user saves the new user profile to the memory 70 of the device 10. The new user profile can also be saved to a server, allowing it to be accessible to a range of other devices in addition to the device 10, as described earlier on. The user profile creation process then ends at step 190.

In some embodiments, a user may create a new user profile on a chosen personal user device 50 rather than on the device 10. The user profile creation process on a personal user device is very similar to that described with reference to FIG. 3. It is noted, however, that when creating a new user profile on a personal user device, the step 150 of linking the personal user device with the new user profile is simplified, since all that is required is that unique information identifying the particular personal user device is added to the user profile as it is created. This can be done automatically by the personal user device during user profile creation. Once the user profile device has been created, a connection between the personal user device 50 and device 10 can be established according to, for example, one of the wireless transmission methods discussed with reference to step 150 of FIG. 3. The newly created user profile can then be transmitted to the device 10 and stored in the memory 70. The newly created user profile could also be transmitted to a server and stored on the server.

By allowing the user profile to be created on a personal user device 50, a user may create the user profile using a more efficient user interface than that which might be available for the device 10. For example, if the personal user device 50 that the user wishes to use is a tablet computer or mobile phone comprising a touch screen interface, then this might be more efficient for the user to use in setting up a new user profile when compared to, say, using a remote controller for the device 10 to set up the new user profile.

Once the user profile has been created, it can be edited at any time. In particular, a personal user device 50 can be linked or un-linked to the user profile at any time. The linking of a new personal user device 50 to the user profile occurs in exactly the same way as that described with reference to step 150 of FIG. 3. The un-linking of an existing personal user device 50 can be carried out simply by issuing a suitable command to either the device 10 or the personal use device 50.

It is possible for multiple personal user devices 50 to be linked to a single user profile. In this case, the user can decide which personal user device 50 they wish supplementary information SI to be sent to. For example, if the command to start transmission of the supplementary information SI is to be issued at the device 10, then the user could be presented with a list of the personal user devices linked to their profile and could select a device from the list. Alternatively, if the command to start transmission of the supplementary information SI is to be issued at a personal user device 50, then the supplementary information SI is simply transmitted to the device from which the command is issued.

By allowing the user to link or un-link personal user devices 50 to their user profile at any time and to store their user profile on a server, the user is given a lot of flexibility for receiving supplementary information SI that they require. For example, if the user is visiting a friend and using the friend's device 10 instead of their own, then they may download their user profile onto the friend's device 10 from the server. They may then link a personal user device 50 belonging to their friend to their user profile, allowing supplementary information SI specified by their user profile settings to be transmitted to this different personal user device 50. The user is thus able to receive supplementary information SI that is tailored to their specific requirements with minimal effort, even though they are using a different device 10 and a different personal user device 50.

Figure 4:
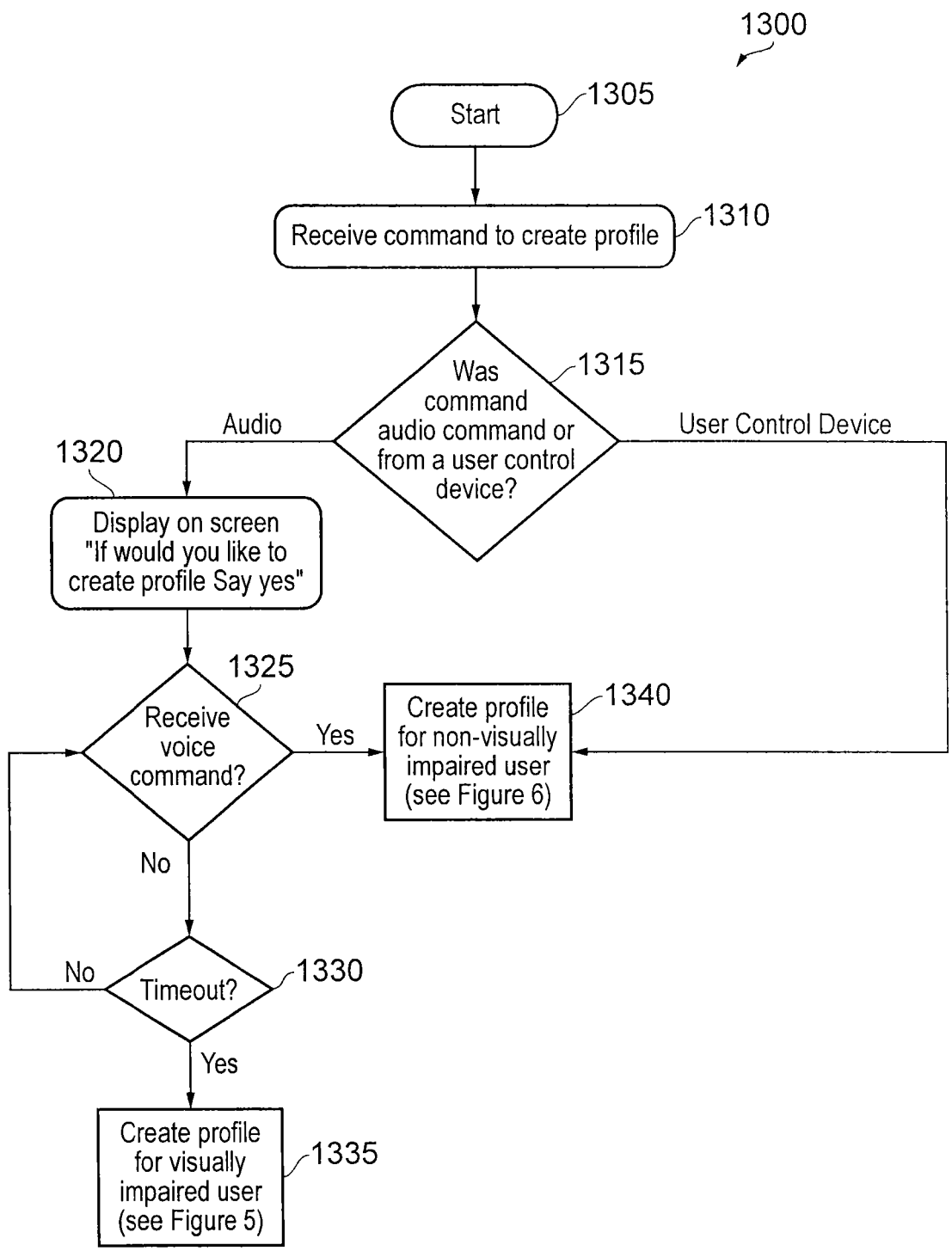
FIG. 4 shows a flow chart explaining the process of choosing a user profile creation process depending on whether or not a user has a visual impairment.

FIG. 4 shows a flow chart 1300 explaining the process of creating a user profile for the second embodiment, in which supplementary information is transmitted over a speaker system. The creation of a user profile starts 1305. In order to start the process of creating a user profile, the directional sound apparatus 1200 receives an appropriate command from a user (step 1310). This command many be received from a user control device such as a smartphone or tablet running an appropriate application program (hereinafter referred to as an "App") or a remote control. Alternatively, the directional sound apparatus 1200 may receive an appropriate voice command from a user. The voice command to create a user profile would be advantageous for a user who is visually impaired as they may find accessing a tablet or remote controller difficult. The voice command may be a particular phrase such as "television—create new user profile". It is advantageous to use a particular phrase that would not be used in conversation or used to control other devices to avoid accidentally creating new user profiles. Moreover, the directional sound apparatus 1200 can understand this phrase in several languages. Based on the language of the received phrase, the directional sound apparatus 1200 can determine the preferred language of the user and also the language of further instructions to be displayed to the user.

The directional sound apparatus 1200 determines whether the command was an audio command or whether the command was a command received from a user control device.

In the case that the command was an audio command, the directional sound apparatus 1200 determines whether the user issued a voice command because they were visually impaired, or whether the user was not visually impaired but felt more comfortable issuing a voice command. In order to make this determination, the directional sound apparatus 1200 displays on the television 1105 a visual indication asking the user if they would like to create a new user profile. Specifically, the television 1105 displays "If you would like to create a new user profile, say yes". If the user issued the voice command in a different language, the directional sound apparatus 1200 will display the visual indication in an appropriate language (step 1320).

It is important to note here that the directional sound apparatus 1200 does not provide any audio indication asking the user if they would like to create a new user profile. The reason only a visual request is issued is because if the user is visually impaired, they will not be able to read this and so the directional sound apparatus 1200 can determine that the user is visually impaired if no response is received within a certain time period.

The directional sound apparatus 1200 listens for a voice command through the microphone 1240 (step 1325).

If a voice command is not received, the directional sound apparatus 1200 checks to see if a time-out period has expired (step 1330). Although the time-out can be any appropriate period, it is envisaged that a time out period of 20 seconds is selected. This provides a non-visually impaired user with time to issue a verbal command, whilst ensuring that a visually impaired user does not wait too long before the process of creating a new user profile can begin.

If the time-out expires, the directional sound apparatus 1200 assumes that the user is visually impaired and creates a new user profile for a visually impaired user (step 1335). This is described with reference to FIG. 5.

If, on the other hand, a voice command is received within the time-out period, a new user profile is created for a non-visually impaired user (step 1340). This is described with reference to FIG. 6.

If the command to create a new user profile was received from a user control device, the directional sound apparatus 1200 assumes that the new user profile is for a non-visually impaired user.

It is noted that the directional sound apparatus 1200 may receive commands from a user control device by way of a user input block 1220. Also, the directional sound apparatus may receive voice commands by way of a microphone 1235 connected to a user input/output block 1225. More details are given with reference to FIG. 12.

Figure 5:
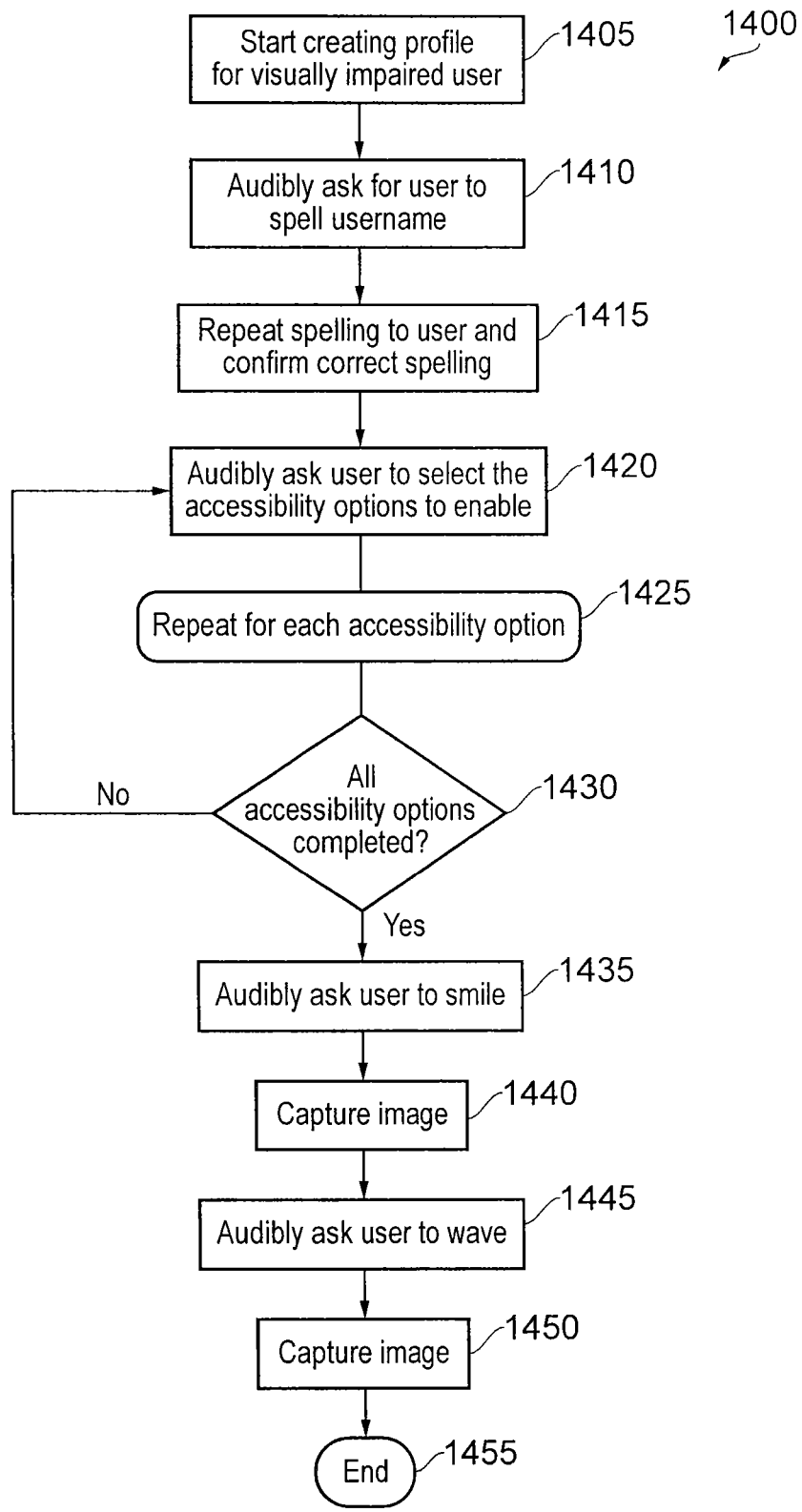
FIG. 5 shows a flow chart explaining the process for creating a new user profile for a visually impaired user.

Referring to FIG. 5, the process 1400 for creating a new user profile for a visually impaired user is described. The process for creating a new user profile for a visually impaired user begins in step 1405. The directional sound apparatus 1200 audibly asks the user to spell a user name (step 1410). The directional sound apparatus 1200 will issue this request through a speaker located on the directional sound apparatus 1200. Alternatively, the request may be issued through one or more speakers 1115A-1115E located around the room. Again, this request will be made in the language chosen by the user.

After the user has indicated that the username is complete by either saying "end" or staying silent for a period of time such as 5 seconds, the directional sound apparatus 1200 checks to ensure that the username is not already associated with an existing user profile. If the username is associated with an existing user profile, the directional sound apparatus 1200 will ask the user to select another username.

When a unique username is provided by the user, the directional sound apparatus 1200 audibly repeats the spelling to the user. The user is requested to confirm that the spelling is correct (step 1415).

After confirmation that the username is correct, the directional sound apparatus 1200 audibly asks the user to select the appropriate accessibility options (step 1420). In this case, accessibility options means profile settings that provides additional and/or different content to enable a non-standard user to have increased enjoyment of a televisual experience.

Examples of accessibility options are audio descriptors for visually impaired viewers, the use of Text to Speech facilities, language options such as providing an appropriate audio stream for multi-language programs, director's comments in a film, etc.

The directional sound apparatus 1200, in embodiments, may audibly provide the accessibility options to the user as a single list and ask the user to verbally repeat back the accessibility options they wish to activate. The selected options repeated by the user will be received by the microphone 1235. Alternatively, the accessibility options will be audibly provided individually. After each accessibility option is heard by the user, the user simply confirms that they wish to select that option. This embodiment is shown in FIG. 5 where the user is asked to select one of the accessibility options and after confirmation that the user does or does not wish to have that option (step 1420), this process is repeated for all accessibility options (step 1425).

It should be noted that, in embodiments, the voice profile of the user is captured and stored in association with the new user profile. This is advantageous because it improves the accuracy of voice control of the device.

After all the available accessibility options have been provided to the user (step 1430), the directional sound apparatus 1200 audibly asks the user to smile (step 1435). This enables the directional sound apparatus 1200 to capture an image of the user smiling. It should be noted here that when the directional sound apparatus 1200 captures the user should be sat at a predetermined distance from the camera 1110. This provides a reference shot which will be used to determine where in the scene, the user is located. This image, along with the focal length of the camera and the reference distance, will be stored in association with the user profile. Additionally, directional sound apparatus 1200 will ask the user to wave (step 1445). The directional sound apparatus 1200 captures an image of the user waving (step 1450). Again the image of the user waving will be stored in association with the user profile. The profile creation process then ends (step 1455).

Figure 6:
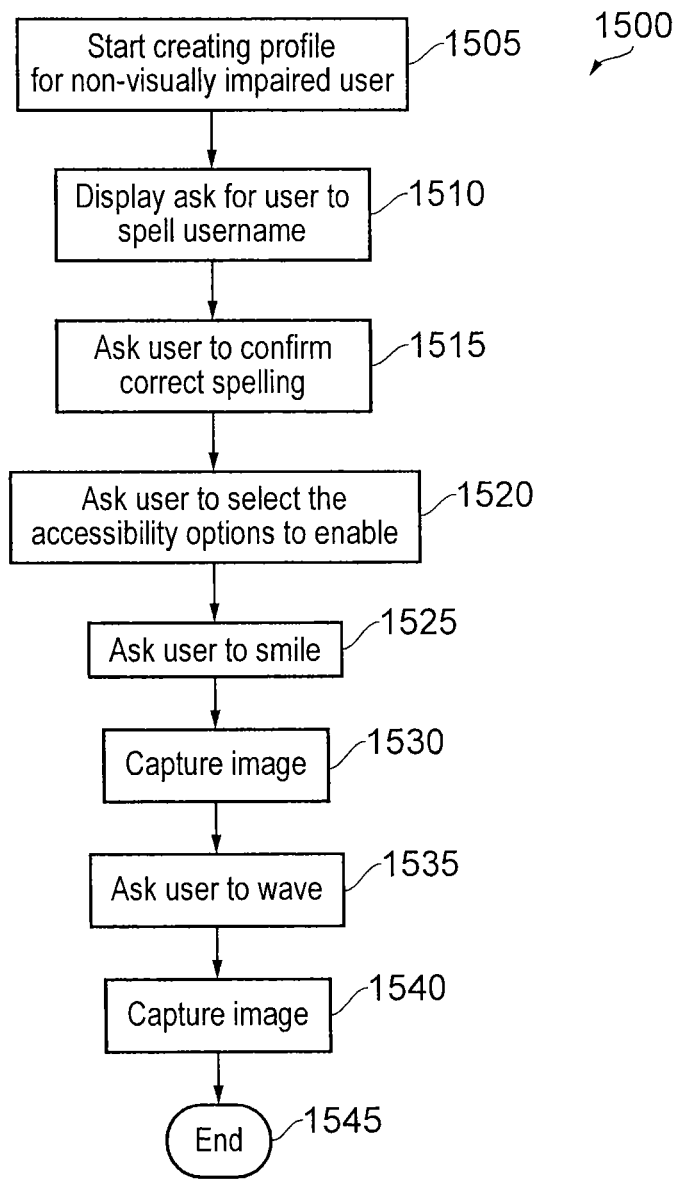
FIG. 6 shows a flow chart explaining the process for creating a new user profile for a non-visually impaired user.

Referring to FIG. 6, the process for creating a new user profile for a non-visually impaired user (step 1500) will now be described.

In step 1505, the process starts creating a new user profile for a non-visually impaired user. A display will ask for the user to input their desired username (step 1510). In embodiments, the display is the television 1105. In this case, the user may input the username using the remote controller or a keyboard. Alternatively, the display may be provided by a smartphone or tablet. Indeed, the situation of the user entering their username and accessibility information on a tablet will be described with reference to FIG. 7 later.

The directional sound apparatus 1200 will then check that the username is not already associated with an existing user profile. The directional sound apparatus 1200 will ask the user to confirm the username.

After an appropriate username is selected, the directional sound apparatus 1200 will ask the user to select the accessibility options to be associated with their profile (step 1520). This selection will, in embodiments, be made from a list.

Following this, the user's image is captured as explained with reference to FIG. 5 in a smiling and waving pose.

The process for creating a new user profile then ends (step 1545).

When a new user profile is created, the profile may be uploaded to a server (not shown) for storage thereon. The server may be located locally within the user's home, or may be located on the cloud. For cloud based storage, the user would be able to use their profile settings in other locations, such as at a friend's house or a relative's house by simply downloading their profile to a device in the remote location.

Figure 7:
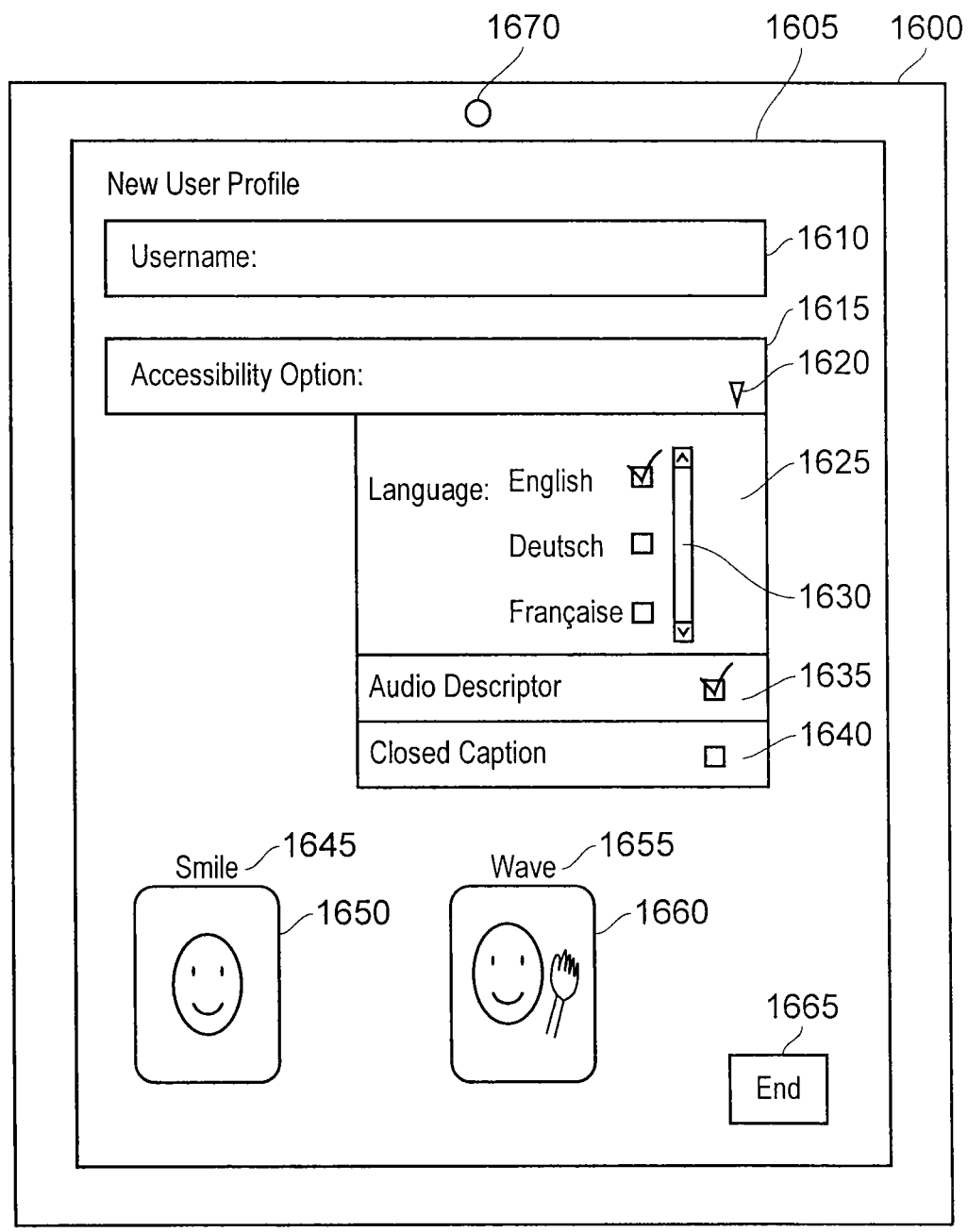
FIG. 7 shows a tablet computer running a program application through which a user profile can be created.

FIG. 7 shows a tablet 1600 such as an Xperia tablet upon which an app is run. The tablet 1600 provides a display 1605 upon which a non-visually impaired user may generate a new user profile. The tablet display 1605 has a touchscreen interface. On the display 1605 a new user profile form is provided. The user touches the username field 1610. Upon pressing the username field 1610, a virtual keyboard is activated (not shown). The virtual keyboard enables the user to enter their desired username.

The new user profile form also includes an accessibility option field 1615. In embodiments, the accessibility options are provided in a list format. Therefore, the user may press the dropdown arrow 1620. When the user presses the dropdown arrow, the list of accessibility options is provided.

In a first accessibility option field, the user language is selected. As the user has previously conversed with the directional sound apparatus 1200 in English, the English language box is ticked. Clearly, if the user would prefer an alternative language, they can select another language. Selecting another language automatically cancels the selection of English. In order to save space on the display, only the three most popular languages are shown. The user may drag the scroll bar 1630 to scroll through the remaining languages.

The two other fields in the accessibility options are the audio descriptor field 1635 and the closed caption field 1640. By selecting these options, the audio descriptor facility and closed caption facility will be enabled and associated with this new user profile. In this case, the user has selected the audio descriptor feature as highlighted by the check mark.

The user highlights the "smile" mark 1645. This activates the camera 1110 located atop the television 1105. The user can have their image displayed on the television 1105 and then captured after a predetermined time. Alternatively, the user may press the smile button 1650. If the user presses the smile button 1650, a front facing camera 1670 located on the tablet 1600 will capture the image of the user's face. In this case, the image of the user's face appears in the smile button 1650. A similar procedure is carried out to capture the image of the user waving by using the "wave" mark 1655 or the wave button 1660. The captured images and the other data (such as the focal length of the camera 1110 and the distance from the camera) are stored within the tablet 1600.

Upon completion of the new user profile form, the user presses the end button 1665. After the end button has been pressed, the new user profile is transmitted to the directional sound apparatus 1200 for storage and for optional uploading to a server.

Transmitting Supplementary Information to a Personal User Device

Figure 8:
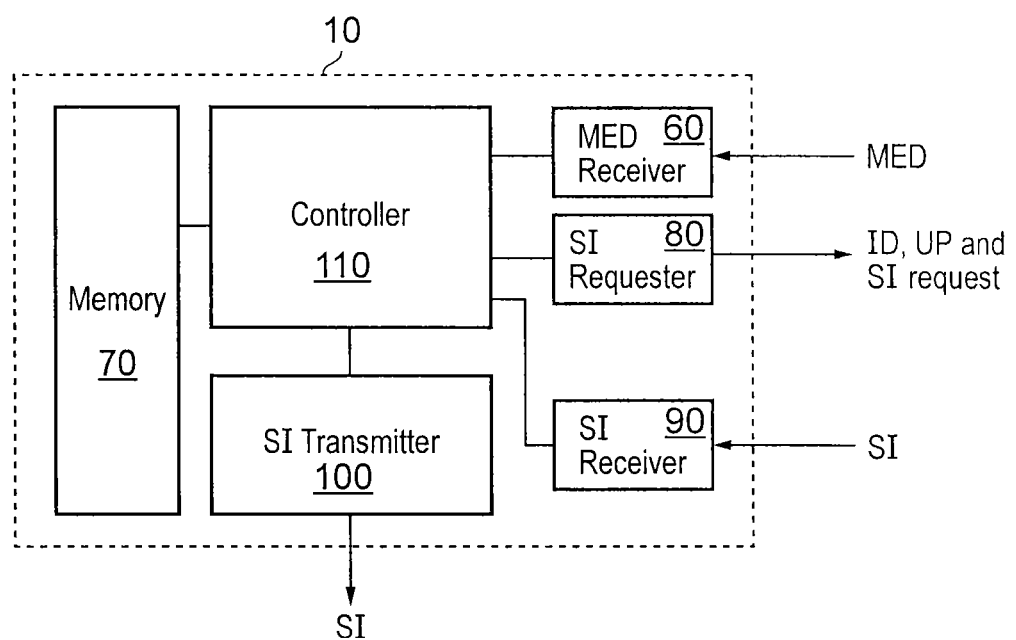
FIG. 8 shows a block diagram of a device for transmitting supplementary information to a personal user device.

Referring to FIG. 8, a block diagram of the device 10 is shown, according to the first embodiment of the present disclosure.

The device 10 comprises a media content item receiver 60 operable to receive a media content item as a data stream MED. The data stream comprises the identifying data ID which uniquely identifies the media content item. A memory 70 is operable to store user profile information UP associated with a user of the device. A supplementary information requester 80 is operable to transmit the identifying data ID which identifies the media content item, the user profile information UP, and a request for supplementary information SI related to the media content item to a server 40 over a network 30. A supplementary information receiver 90 is operable to receive supplementary information SI related to the media content item from the server over the network. The supplementary information SI is determined by the server on the basis of the transmitted identifying data ID which identifies the media content item and the transmitted user profile information UP. A supplementary information transmitter 100 is operable to transmit the received supplementary information SI to a separate personal user device specified by the stored user profile information UP. The overall operation of the user device 10, as described above, is controlled by the controller 110.

The operation of the device 10 will now be described with reference to FIGS. 9A-9B.

Figure 9A:
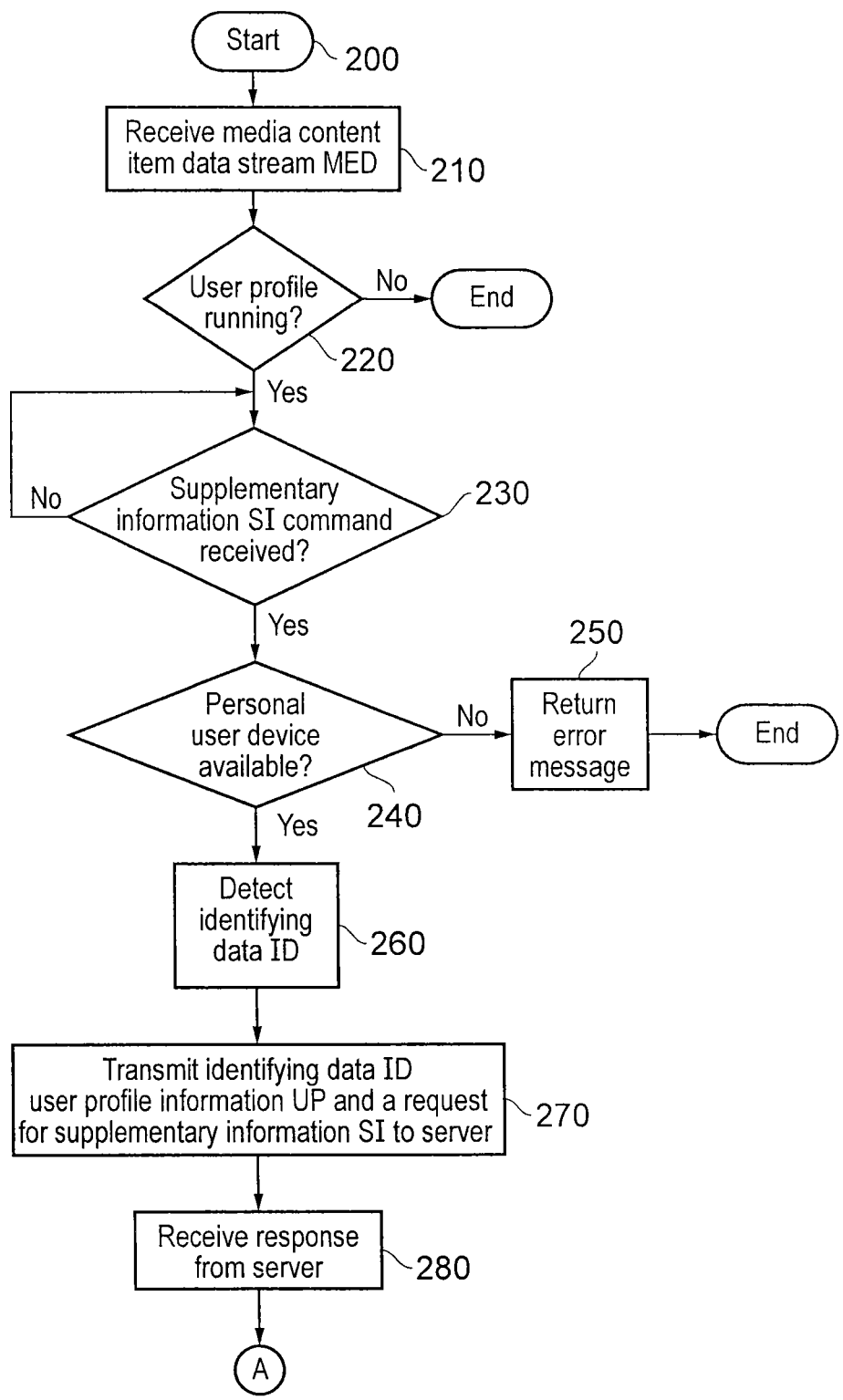
FIGS. 9A-9B show a flow chart explaining the process of supplying the supplementary information to a personal user device.

Starting with FIG. 9A, the process starts at step 200. At step 210, the device 10 receives a media content item data stream MED containing the data representing a media content item. As discussed above, the data stream MED will also contain identifying data to uniquely identify the media content item.

At step 220, the device 10 checks to see whether or not a user profile is running. A user profile is running when the user profile information UP comprised within the user profile is made available to the device 10. For example, a user could log in to their user profile using the device 10, thus making their user profile information UP available.

If there is no user profile running, then the process is ended. On the other hand, if there is a user profile running, then the process moves to step 230. Here, the device 10 checks to see whether or not a supplementary information SI command has been issued to start transmitting supplementary information SI to a personal user device 50. If no command has been issued, then the device 10 checks again, and waits until such a command has been issued. On the other hand, if a command has been issued, either from the device 10 or from the personal user device 50, then the process moves to step 240.

At step 240, the device 10 checks to see whether or not the personal user device 50 associated with the user profile is available to receive supplementary information SI. If the command to start transmitting supplementary information is issued from the device 10, then the availability of the personal user device 50 is checked by sending a test signal to the personal user device 50 and waiting for a response (as described earlier with reference to the section "Creation of User Profile"). On the other hand, if the command to start transmitting supplementary information is issued from the personal user device 50, then the device 10 assumes that the personal user device 50 is available to receive supplementary information SI. This is because the personal user device 50 will not issue a command to start the transmission of supplementary information SI (as in step 230) unless it is in a state in which it is available to receive that supplementary information SI.

If the personal user device 50 is not available to receive supplementary information SI, then the process moves to step 250, where the device 10 returns an error message to the user. The process then ends. On the other hand, if the personal user device 50 is available to receive supplementary information SI, then the process moves to step 260.

At step 260, the device 10 detects the identifying data ID for identifying the media content item in the data stream MED. Then, in step 270, the device 10 transmits the identifying data ID, the user profile information UP comprised in the user profile that is running and a request for supplementary information SI to the server 40.

At the server 40, the supplementary information is selected on the basis of the identifying data ID and user profile information UP that the server 40 receives from the device 10. Specifically, when the server 40 receives the identifying data ID, the user profile information UP and the request for supplementary information from the device 10, the server 40 searches through supplementary information stored thereon to find the supplementary information SI corresponding to the received identifying data ID for the media content item and user profile information UP. For example, if the received identifying data ID identifies a particular movie and the user profile information UP specifies that the user associated with that user profile information UP requires subtitles, then the server 40 will search the stored supplementary information in an attempt to find subtitles for that particular movie.

At step 280, the device 10 receives a response from the server. The response indicates to the device 10 whether or not the server 40 was able to find the supplementary information SI desired by the user, in accordance with the identifying data ID of the received media content item and the user's supplementary information requirements as specified in the user profile information UP.

Figure 9B:
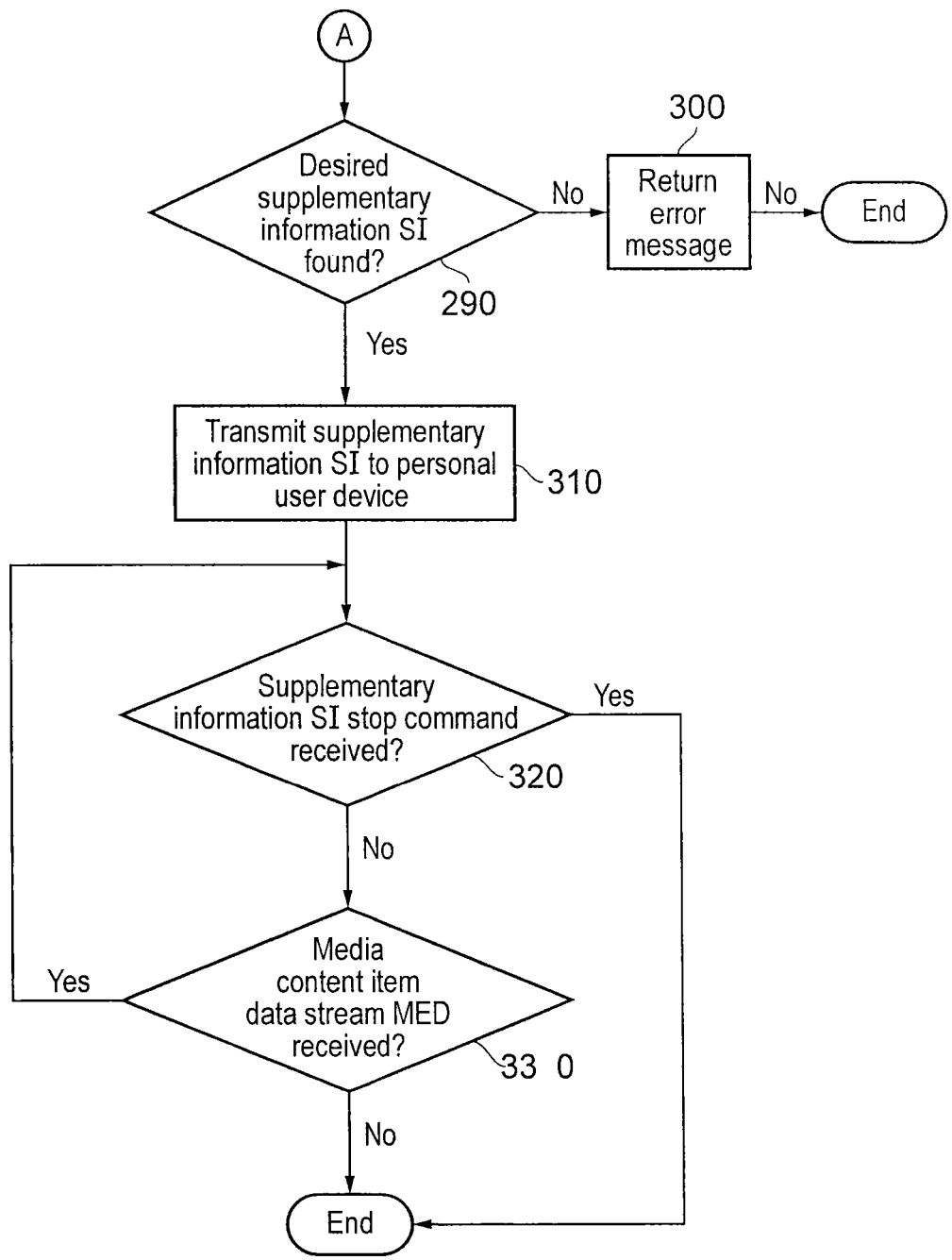

Moving on to FIG. 9B, at step 290, the device 10 determines, from the server response, whether or not the desired supplementary information SI has been found. If the server response indicates that the desired supplementary information SI has not been found (this could happen if, for example, a particular type of supplementary information SI is not yet available for a particular media content item), then the device 10 returns an error message to the user at step 300. The process is then ended. On the other hand, however, if the server response indicates that the desired supplementary information SI has been found, then the process moves on to step 310. At step 310, the server begins transmitting to the device 10 a data stream carrying the desired supplementary information SI that has been found.

The process then moves on to step 320, in which the device 10 detects whether or not a command to stop the transmission of supplementary information SI has been issued by the user. If such a command has been issued, then the process is ended and the transmission of supplementary information SI to the device 10 from the server and from the device 10 to the personal user device 50 is stopped. If such a command has not been issued, then the process moves on to step 330.

At step 330, the device 10 detects whether or not the media content item data stream MED is still being received. If the device 10 continues to receive the data stream MED (for example, if the data stream for the media content item is still being broadcast), then the process returns to step 320, where the device 10 detects whether or not a command to stop transmission of supplementary information SI has been issued. On the other hand, if the device 10 no longer receives the data stream MED (for example, if the media content item has ended or if the user changes the media content item that is to be received), then the process is ended.

In this way, with reference to steps 320 and 330, the device 10 continuously monitors whether or not continued transmission of supplementary information SI to the personal user device 50 is required.

It is noted that the data representing the media content item in the received data stream MED must be transmitted to a suitable audio/visual device (AV device), such as a television, computer monitor, projector and/or loudspeaker, in order for the user to watch and/or listen to the media content item. This can be achieved, for example, by the device 10 transmitting the received data stream MED to a suitable AV device. Alternatively, the received data stream MED could be sent to both the device 10 and a suitable AV device simultaneously. This could be achieved by, for example, splitting the signal associated with the data stream MED before it is sent to either the device 10 or the suitable AV device, so that it can be sent to both devices.

It is also important that the media content item and supplementary information are experienced by a user in correct synchronisation, so that the supplementary information seen or heard by the user at a particular time is relevant to the part of the associated media content item being seen or heard by the user at that particular time. For example, if the user chooses subtitles as supplementary information SI for a movie, then it is important that the subtitles are presented in proper synchronisation with the spoken dialogue of the movie.

Such synchronisation can be ensured by including synchronisation data in both the media content item data stream MED and supplementary information SI data stream. Any suitable synchronisation data could be used. For example, if both the MED and SI data streams are packetized data streams, then each data packet of each data stream can be given a predetermined packet ID, with a pair of corresponding data packets, one in each data stream, having the same packet ID. The packet ID could be a number which consecutively increases for each data packet. The device 10 is then able to synchronise the two data streams, by, for example, transmitting an SI data packet only at the instant that the corresponding MED data packet has been received and not before. If SI data packets are received at a faster rate than MED data packets, then the SI data packets for which corresponding MED data packets have not yet been received can be stored in the memory 70 of the device 10 until they are required. On the other hand, if MED data packets are received at a faster rate than SI data packets, then an error message could be returned to the user, or the playback of the media content item could be paused until the required SI data packets are received.

Figure 10:
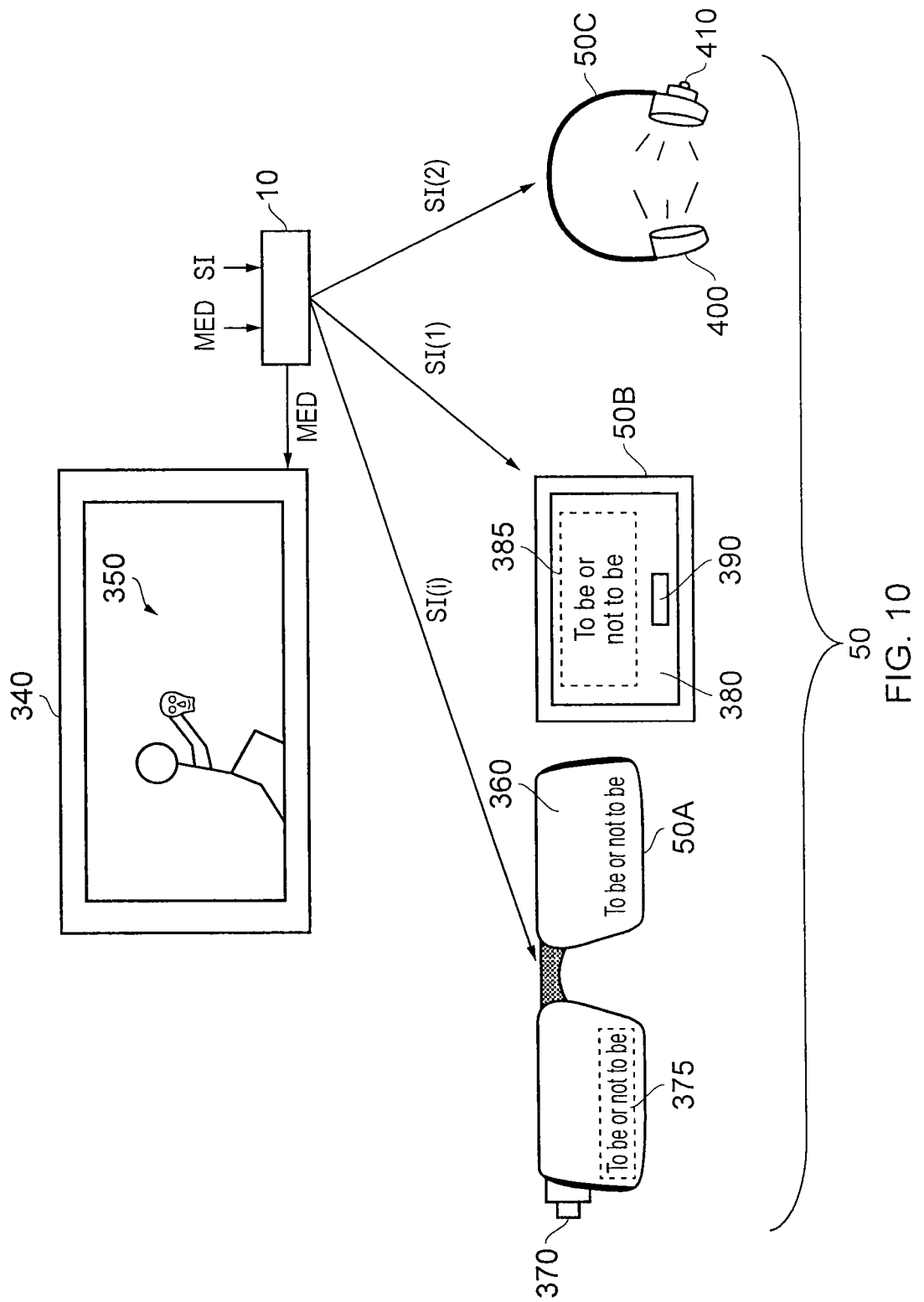
FIG. 10 shows a diagram of supplementary information being transmitted to various different personal user devices.

FIG. 10 schematically illustrates a set-up involving the device 10 and various examples of personal user devices 50, according to an embodiment of the present disclosure. As can be seen, the media content item data stream MED and the supplementary information SI are received by the device 10, as explained earlier.

The device 10 is connected to a television 340 and transmits the data stream MED to the television 340. As discussed earlier, however, the television 340 is merely an example of an AV device which could be used with the device 10, and there are many other suitable AV devices which could be used. The television 340 extracts the data representing the media content item comprised within the received data stream MED, and presents the media content item to the user on a screen 350. In this particular case, the media content item is a movie.

The device 10 also transmits the received supplementary information SI to the personal user devices 50. In this case, multiple personal user devices 50 each receive a particular type of supplementary information SI. Such an arrangement is possible when the device 10 has multiple supplementary information SI transmission channels, so that relevant supplementary information SI can be individually sent to a personal user device 50 connected on each channel, and when each of the personal user devices are associated with a user profile which is running on the device 10. Such an arrangement allows multiple users to independently receive supplementary information SI according to their individual needs.

Three examples of personal user devices 50 are given in FIG. 10. Although each of these personal user devices are described in the context of using multiple personal user devices simultaneously with the device 10, they would, of course, also be usable if they were the only personal user device connected to the device 10.

The first example is a pair of glasses 50A, wearable by the user, and comprising at least partially transparent lenses 360. Here, the glasses are an example of a head-mountable display.

The lenses 360 each comprise an electronic display which can superimpose images onto the view of the user when the glasses are worn. Any suitable electronic display known in the art could be used, such as a liquid crystal display (LCD).

Figure 11:
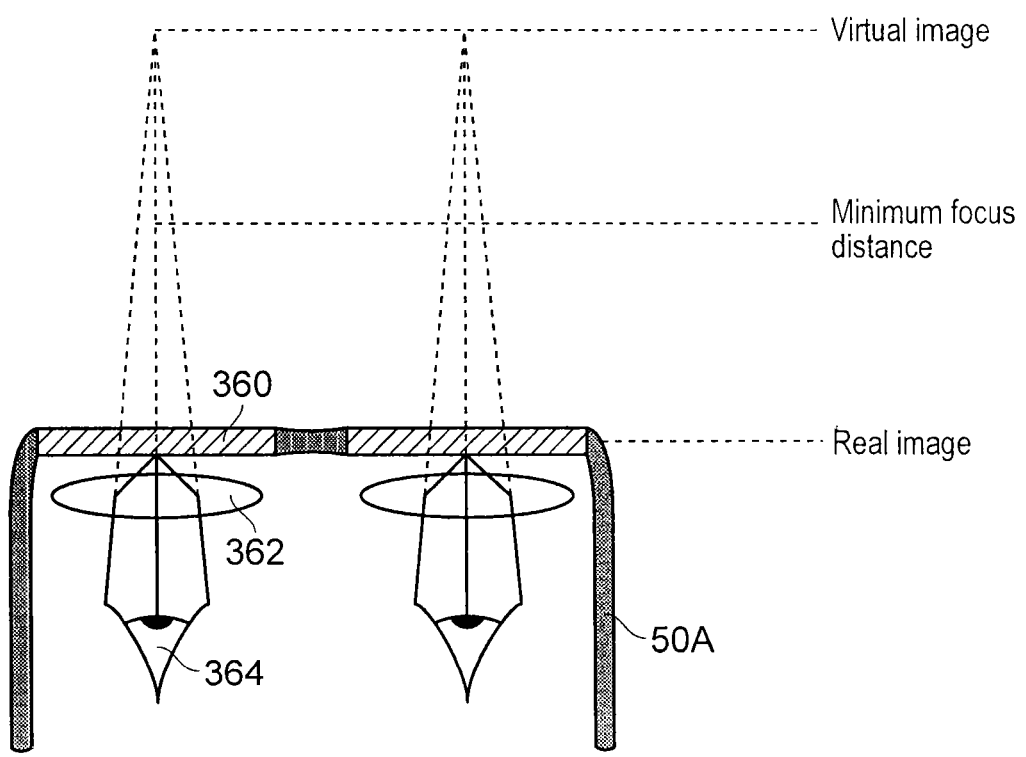
FIG. 11 shows a diagram of a head mountable display device for use as a personal user device.

As shown in FIG. 11, it may also be necessary for the glasses to comprise a converging lens 362 for each of the lenses 360, placed such that when the user is wearing the glasses, the converging lens 362 for each lens 360 is located between the user's eye 364 and the respective lens 360. This ensures that any images generated by electronic display appear to the user at a distance at which the user's eyes are able to focus, through the use of a virtual image. The converging lens 362 for each lens 360 could be comprised as part of the electronic display for each lens 360.

The glasses 50A receive first supplementary information SI (1) from the device 10. In this particular example, the first supplementary information is subtitles. The subtitles can thus be presented to the user using the electronic display for each of the lenses 360. Advantageously, because the subtitles 375 are superimposed onto the view of the user, the user can watch the television screen 350 and look at the subtitles simultaneously. This gives the impression to the user that they watching a movie with subtitles in the usual way (that is, with subtitles superimposed onto the content). At the same time, other users who do not need subtitles cannot see the subtitles, and hence their viewing experience is not disrupted.

The glasses 50A can comprise a physical button 370, which can be used for linking the glasses 50A as a personal user device to a user profile during profile creation (see description relating to step 150 of FIG. 3) or for issuing a command to start or stop the transmission of supplementary information (such as subtitles) to the glasses (see description relating to step 170 of FIG. 3).

The second example of a personal user device is a tablet computer 50B such as the Sony Xperia® Tablet S. The following description could, however, also apply to other devices such as smartphones such as the Sony Xperia® T. In this case, an App is run on the tablet computer 50B to enable it to receive supplementary information from the device 10 and display it to the user. In this particular example, it is the first supplementary information SI (1) (subtitles) that is transmitted to the tablet computer 50B.

The subtitles 385 are displayed on a screen 380 of the tablet computer 50B as part of a graphical user interface (GUI) of the App. Thus, in a similar fashion to that of the glasses 50A, this advantageously allows the user associated with the tablet computer 50B (and other users able to observe the tablet computer screen 380 from a suitable viewpoint) to see subtitles for the movie being played without those subtitles having to be displayed on the television 350. Disruption to the viewing experience of other users who do not require subtitles is therefore avoided.

The GUI of the App on the tablet computer 50B can comprise a virtual button 390 which can be used for linking the tablet computer 50B as a personal user device to a user profile during profile creation (see description relating to step 150 of FIG. 3) or for issuing a command to start or stop the transmission of supplementary information (such as subtitles) to the tablet computer (see description relating to step 170 of FIG. 3). The virtual button 390 can be operated via the user interface of the tablet computer 50B, such as via a touch screen, a selection cursor (such as a mouse cursor) or physical selection buttons (such as a directional pad (D-pad)).

The third example of a personal user device is a pair of headphones 50C which can receive supplementary information SI from the device 10. In this particular example, the headphones 50C receive second supplementary information SI (2) from the device 10, the second supplementary information SI (2) being audio supplementary information such as an audio description. When the user wears the headphones, with the audio cups 400 over their ears, the audio description is played to them as they watch the movie on the television screen 350. The usual audio information associated with the movie (dialogue, etc.) can also be transmitted to the headphones 50C, so that all audio information required by the user can be heard through the headphones 50C.

Advantageously, the headphones 50C allow a user to receive an audio description for the movie if they need one. At the same time, however, other users who watch the movie without the headphones do not hear the audio description. Rather, they just hear the usual audio information associated with the movie. The viewing experience of these other users is therefore not disrupted.

The headphones 50C can comprise a physical button 400, which can be used for linking the headphones 50C as a personal user device to a user profile during profile creation (see description relating to step 150 of FIG. 3) or for issuing a command to start or stop the transmission of supplementary information (such as subtitles) to the headphones (see description relating to step 170 of FIG. 3).

It is noted that, although in the above examples, the first supplementary information SI (1) transmitted to the glasses 50A and tablet computer 50B was subtitle information and the second supplementary information SI (2) transmitted to the headphones 50C was an audio description, this need not necessarily be the case. In fact, any type of supplementary information could be sent to these personal user devices. The only requirement is that a particular personal user device is able to deliver the supplementary information it receives to the user.

For example, as well as receiving subtitles, the glasses 50A and/or tablet computer 50B could also receive other types of visual supplementary information, such as sign language information. This could be in the form of a video stream of a person translating the spoken dialogue from the movie into sign language. The glasses 50A and/or tablet computer 50B could also receive audio supplementary information such as an audio description. The audio supplementary information could then be delivered to the user by means of, for example, headphones comprised within the glasses 50A or connected to the tablet computer 50B.

Because the present disclosure allows the supplementary information SI to be provided to a user via a separate personal user device 50, it is not necessary for that supplementary information SI to be provided as part of a media content item that is being played back. For example, it is not necessary for subtitles to be overlaid on top of a media content item as it is being played back, nor is it necessary for an audio description to be played in addition to the usual sounds (dialogue, etc.) of a media content item as it is being played back. Hence, the supplementary information SI is still provided to users who require it, but at the same time, disruption to the viewing experience of other users due to the presence supplementary information such as subtitles or an audio description is reduced.

Transmitting Supplementary Information Via a Speaker System

Figure 12:
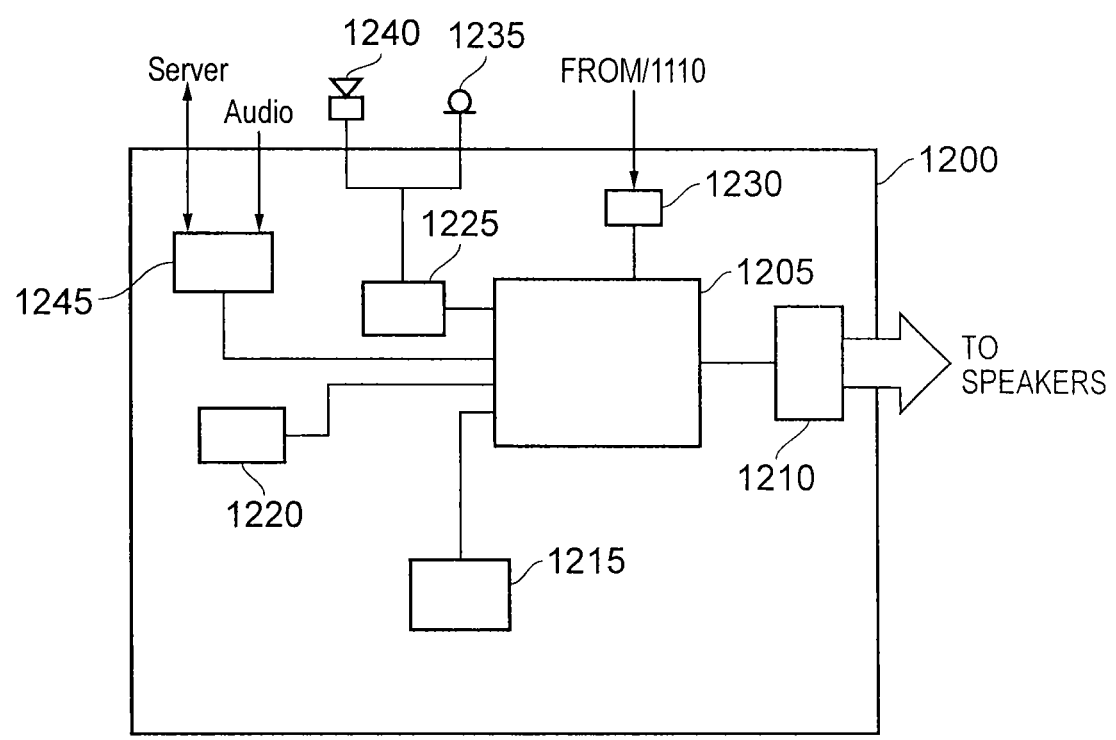
FIG. 12 shows a block diagram of directional sound apparatus for controlling a speaker system to transmit supplementary audio data.

FIG. 12 shows a block diagram of directional sound apparatus 1200. The directional sound apparatus 1200 comprises a controller 1205 connected to a speaker output unit 1210. The speaker output unit 1210 controls the signal to each of the speakers 1115A-1115E located around the room. The speaker output unit 1210 may therefore be wired or wirelessly connected to each of the speakers 1115A-1115E. The speaker output unit 1210 provides different output signals to different speakers to ensure that the audio signal presented to a particular location has a particular characteristic. In order to achieve this, the sound received at each location within the scene is calibrated. This calibration is performed during the initial set-up of the directional sound apparatus 1200. Such calibration is known in the art where a microphone is located in a specified location within the scene and test sounds are emitted from each speaker in a particular manner. Examples of the calibration systems include Audyssey, Multi-Channel Acoustic Calibration MCAA or Anthem Room Correction (ARC). In general, the mechanism for providing a particular audio signal to a particular location is known in the field of surround sound systems and so will not be explained in any more detail for brevity. For example, in the context of cinema, U.S. Pat. No. 5,798,818A describes a system that provides a particular audio signal to a particular location. The contents of U.S. Pat. No. 5,798,818A are hereby incorporated by reference. Other devices such as those sold by Directional Audio® are also examples of such systems.

The controller 1205 is also connected to a storage device 1215. The storage device 1215 may be any kind of memory such as solid state memory. The storage device 1215 stores a user profile which will be described later. Additionally, the storage device 1215 also stores a computer program which contains computer readable instructions which, when loaded onto the controller 1205 configures the controller 1205 to perform a method according to embodiments.

The controller 1205 is also connected to a user input block 1220. The user input block 1220 receives user instructions to control the directional sound apparatus 1200. For example, the user input block 1220 may receive instructions from a remote control device which the user operates over an Infra-Red link. Alternatively or additionally, the user input block 1220 may receive control instructions from a user via a smartphone such as the Sony Xperia® T or via a tablet such as the Sony Xperia® Tablet S using WiFi or Bluetooth. Whilst the remote control device may be unique to the directional sound apparatus 1200, the smartphone or the tablet may require an App to operate.

The controller 1205 is also connected to a user input/output block 1225. The user input/output block 1225 is further connected to a speaker 1240 and a microphone 1235. The speaker 1240 is different to those described earlier as speaker 1240 is located close to the directional sound apparatus 1200. The speaker 1240 provides audio commands to one or more of the users located in the room as will become apparent. Also, microphone 1235 is configured to receive voice commands from one or more of the users.

The controller 1205 is also connected to a camera input 1230. The camera input 1230 is coupled to camera 1110 and sends instructions to the camera 1110. Additionally, the camera input 1230 receives data from the camera 1110 such as captured images and metadata associated with the camera lens as will become apparent.

Additionally connected to the controller 1205 is a receiving device 1245. The receiving device 1245 is connected to an audio stream and the server 40. The receiving device 1245 receives the audio stream which is an audio stream associated with a video stream, such as broadcast content or a recorded television program or the like. In other words, the audio stream is an example of a media content item data stream MED. The receiving device 1245 also receives supplemental audio data from the server 40 as supplementary information SI. The supplemental audio data is downloaded from the server on the basis of the video stream to be shown and the accessibility options associated with a particular user. The supplemental audio data may be streamed in real-time from the server, or may be downloaded prior to a user watching a program. In order to download the supplemental audio data, an identifier which uniquely identifies the video stream is provided to the server. The content may be downloaded in advance if the user sets an electronic program guide (EPG) to view a particular program. Downloaded supplemental audio data is stored in memory 1215.

In order to detect the location of the user within the room, the camera 1110 mounted atop the television 1105 is used to capture an image of the scene. The mechanism by which the location of the user is determined will be explained with reference to FIG. 15.

Figure 13A:
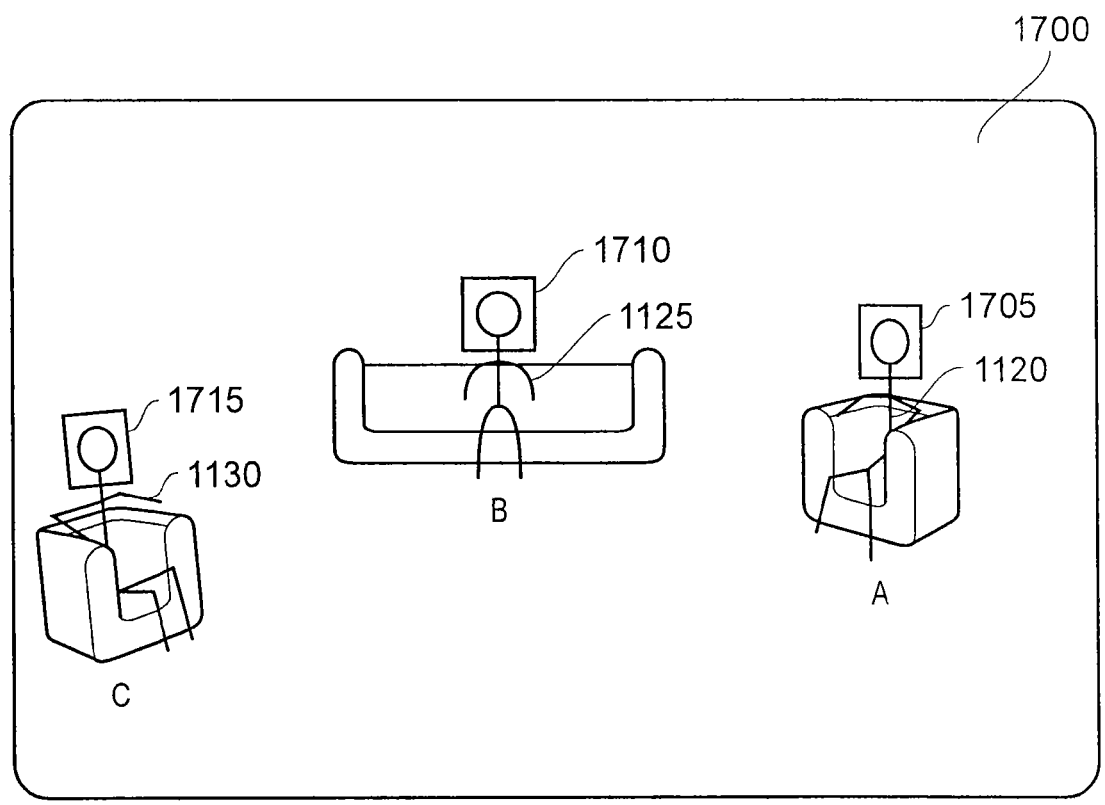
FIGS. 13A-13C show a diagram explaining the determination of the position of a user and the detection of a physical movement of the user.
Figure 14:
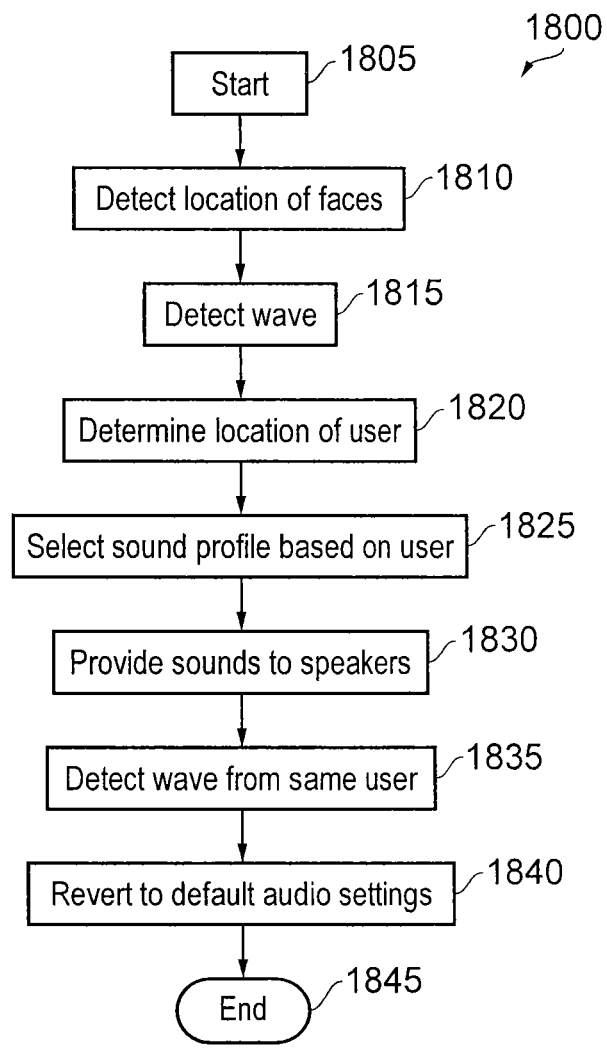
FIG. 14 shows a flow chart explaining the process of transmitting supplementary audio data over a speaker system.

FIG. 13A shows a representative drawing of an image of FIG. 2 captured through camera 1110. In image 1700, the first user 1120 is located at position A, the second user 1125 is located at position B and the third user is located at position C. Additionally, a first small box 1705 surrounds the face of the first user 1120, a second small box 1710 surrounds the face of the second user 1125 and a third small box 1715 surrounds the face of the third user 1130.

The first small box 1705, second small box 1710 and third small box 1715 indicate that the face of a user has been detected in the image. After the faces in the image have been detected, they will be tracked to ensure that as the users move around the scene, the camera 1110 will capture their movements and the directional sound apparatus 1200 will compute the location of each user appropriately. Face detection and tracking techniques are known in the art. An example face detection technique which can detect the face of the first user 1120, the second user 1125 and the third user 1130 and track their movement is provided in "Fast Tracking Using Motion-Guided Dynamic Template Matching", Wang et al, ACCV2002: The $5^{th}$ Asian Conference on Computer Vision, 23-25 Jan. 2002, Melbourne, Australia, the contents of which is hereby incorporated by reference.

Figure 13B:
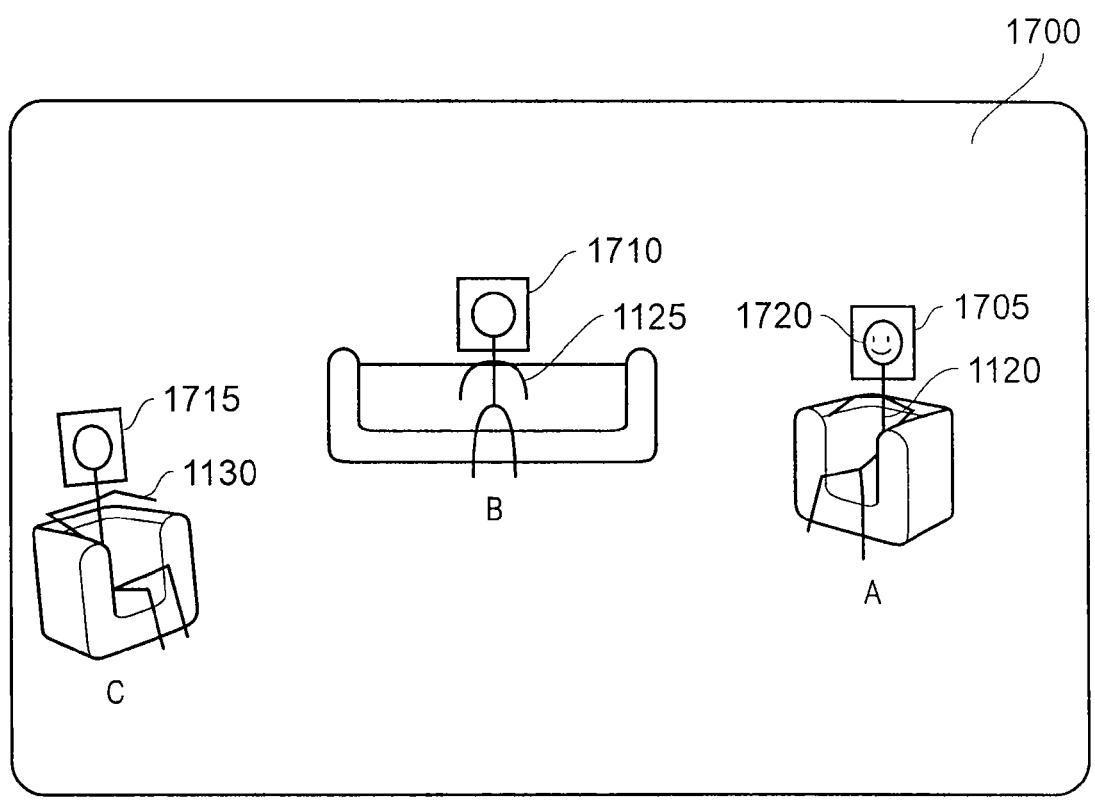

The area defined by each of the first box 1705, second box 1710 and third box 1715 is compared with the stored profile images of different users. From this comparison, and as shown in FIG. 13B, it is determined that the face of the first user 1720 is the same as the face of the user captured in the new user profile form explained with reference to FIG. 7. Accordingly, the location of the user within the scene may be calculated. This will be explained later.

Figure 13C:
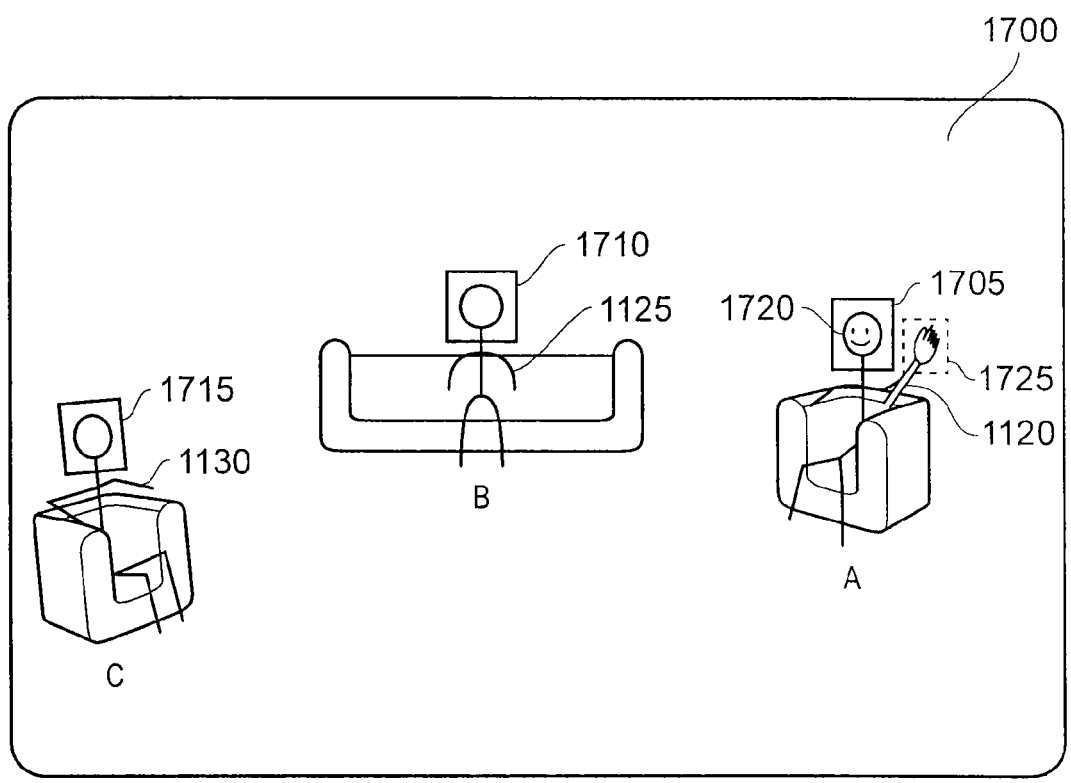

In order to activate the accessibility options associated with the user, the directional sound apparatus 1200 monitors the area surrounding the detected user 1720 for the user waving. This signal provides the directional sound apparatus 1200 with an instruction to provide the user with the accessibility options associated with his or her profile. Again, the Wang et al method is used to detect the user waving. As only the area surrounding the identified user is monitored, the amount of required computation is reduced. As is seen in FIG. 13C, the waving arm of the user is detected as shown by fourth box 1725.

The operation of the system will now be described with reference to FIG. 14. The process starts at 1805. The presence of the users within the scene is calculated from the image captured by the camera 1110 (step 1810). In this step, the identity of each detected user is determined. A waving action performed by one of the detected and recognised users is detected from the image (step 1815). The location of the detected user is determined (step 1820). The accessibility options associated with the user are retrieved from the user profile (step 1825). From the accessibility options the supplemental audio associated with the video stream is downloaded from the server using the receiving device 1245. Based upon the location of the user within the scene, the appropriate audio (which is the standard audio and the downloaded supplemental audio) is provided to the appropriate speaker (step 1830). The audio is selected such that the selected user receives audio that is supplemented by accessibility audio. For example, the selected user receives the standard audio stream and additional audio descriptors. Alternatively, or additionally, the selected user may receive the standard audio stream with dubbing in a different language. However, the other users within the scene will receive only the default audio. This ensures that the user with a particular accessibility requirement receives audio of their choice whilst the remaining members of the viewing audience receive the standard, default audio. This is advantageous because it allows a user with a particular accessibility requirement to enjoy the televisual experience without impacting on the other users within the scene.

After providing the sound to the specific location, the captured scene is monitored to detect another wave from the same user. In embodiments, an area in close proximity to the area where the previous wave was detected is monitored. This is advantageous because the user is likely to wave in a similar manner as previously, and monitoring a smaller region reduces computational expense.

After a wave from the same user is detected (step 1835), the audio reverts to the default audio settings (step 1840). In other words, all users within the scene receive the same audio. The process then ends (step 1845).

It will be appreciated that although the above describes the user controlling activating the accessibility options by waving at the camera, many other methods of activation are anticipated. For example, the user may use voice activation, where the voice profile is stored with the user profile.

It will also be appreciated that instead of providing the supplemental audio only when the user waves, the supplemental audio could be provided merely when the presence of a user in the room is recognised. This is advantageous for users who will always require supplementary audio.

Additionally, the user may login and start using the system by interacting with a biometric TV or TV commander.

In some embodiments, the supplementary information stored on the server can be updated or added to by any authorised third party, so that as new media content items become available (for example, new movies or television shows), new supplementary information associated with those new media content items can also be made available. Examples of authorised third parties could include the creators of new media content items themselves or, alternatively, organisations which specialise in the creation of information such as subtitles or audio description. Advantageously, such an arrangement allows the quantity and range of supplementary information available to be continuously improved.

In some embodiments, the supplementary information SI can be transmitted from the server 40 to the device 10 or directional sound apparatus (which, hereinafter, may be referred to simply as the "device 1200" for conciseness) simultaneously with the transmission of the media content item data stream MED to the device. In other words, the supplementary information SI can be streamed from the server 40 to the device 10 or 1200 in real time.

In other embodiments, at least a portion of the supplementary information SI can be transmitted from the server 40 to the device 10 or 1200 prior to the transmission of the media content item data stream MED to the device 10 or 1200. For example, if the media content item data stream MED is to be received as a broadcast data stream at a particular time of day, then at least a portion of the supplementary information SI required for that media content item can be transmitted from the server 40 to the device 10 or 1200 beforehand. Such an arrangement means that the at least a portion of the supplementary information SI does not have to be transmitted to the device 10 or 1200 in real time. Thus, advantageously, the risk of the supplementary information SI provided to a user being interrupted by, for example, limited network bandwidth, is reduced.

In these embodiments, the device 10 or 1200 is operable to receive the identifying data ID for the media content item prior to receiving the data stream MED. The identifying data ID could be transmitted to the device 10 or 1200 over a telecommunications network such as the internet following, for example, a request from the user. Alternatively, for broadcast media content, the identifying data ID could be included in broadcast electronic program guide (EPG) information, which is readable by the device 10 or 1200. Any other suitable method of obtaining the identifying data ID for a particular media content item could also be used. Once the identifying data ID has been received, the relevant supplementary information SI can be obtained in the usual way from the server 40, and stored in the memory 70 of the device 10 or the memory 1215 of the device 1200 until it is required.

It is noted that, although in the description for the first embodiment, examples of media content items have been limited to either movies or television shows, the media content items compatible with embodiments of the present disclosure are not limited to these examples. In fact, any media content item capable of being delivered in the form of a data stream is compatible with the present disclosure. For instance, additional media content items compatible with the present disclosure could include radio shows, music tracks, photographs and software applications. Similarly, the supplementary information is not limited to subtitles or an audio description. Rather, any supplementary information capable of being stored on a server, transmitted to the device 10 over a network and which is in a format compatible with a suitable personal user device 50 is compatible with the present disclosure.

Supplementary information associated with each of the additional types of media content items can be provided to a user in the same way as that discussed above. For example, for a radio show, subtitles for spoken dialogue could be provided as supplementary information SI. For a music track, text data representing lyrics included in the music track could be provided. For a photograph, an audio commentary of the photograph could be provided. For a software application such as a computer game, supplementary information SI related to the gameplay could be provided. For each of these examples, by delivering the supplementary information SI to a user who requires it by way of a suitable personal user device 50 associated with that user, in line with the preferences of that user as specified in their associated user profile information UP, disruption to other users who do not want or require the supplementary information SI is reduced. Similarly, if there are several users, each with their own separate personal user device 50 and associated user profile information UP, each user may edit their user profile information so as to tailor the supplementary information SI they receive for a particular media content item according to their own needs and preferences.

Although the foregoing specifies that the supplementary information is downloaded from a server, the disclosure is not so limited. The supplementary information may be provided over any network, such as a local network, a broadcast network or the like.

It will be appreciated that certain features of the user profile creation process of the second embodiment (see FIGS. 4-7) could be incorporated into the user profile creation process of the first embodiment (see FIG. 3). For example, the process of FIG. 4, in which it is decided as to whether or not a user requires a user profile creation process especially adapted for people with a visual impairment, could occur as a step between the start (step 120 of FIG. 3) and the setting of the new profile name (step 130 of FIG. 3) of the user profile creation process of the first embodiment.

If it is decided that the user is visually impaired, then the setting of the new profile name (step 130 of FIG. 3) could comprise audibly asking the user to spell, repeat and confirm the new profile name (see steps 1410 and 1415 of FIG. 5). Similarly, the selecting of the supplementary information (step 160 of FIG. 3) could comprise audibly asking the user to select their supplementary information options (see steps 1420, 1425 and 1430 of FIG. 5).

On the other hand, if it is decided that the user is not visually impaired, then the setting of the new profile name (step 130 of FIG. 3) could comprise displaying a request to the user to spell and confirm the new profile name (see steps 1510 and 1515 of FIG. 6). Similarly, the selecting of the supplementary information (step 160 of FIG. 3) could comprise displaying a request to the user to select their supplementary information options (see step 1520 of FIG. 6).

Furthermore, for both visually impaired and non-visually impaired users, the step of adding personal information (step 140 of FIG. 3) in the user profile creation process of the first embodiment could comprise capturing images of the user smiling and waving (see steps 1435 to 1450 of FIG. 5 and steps 1525 to 1540 of FIG. 6). Advantageously, the method of the presence of a user being detected by a camera and the user waving (see FIGS. 13-15) could then be used to start or stop the transmission of supplementary information to a personal user device associated with that user. This method could be selected as a delivery option (see step 170 of FIG. 3) during the user profile creation process of the first embodiment.

In order for the above modifications to be realised, the device 10 can comprise a speaker (not shown), a microphone (not shown) and a camera input (not shown) coupled to a camera (not shown) similar to those comprised in the directional sound apparatus and described with reference to FIG. 12). The controller 110 of the device 10 then processes images captured by the camera in order to detect the presence of the user and to detect whether or not the user is waving.

Figure 15:
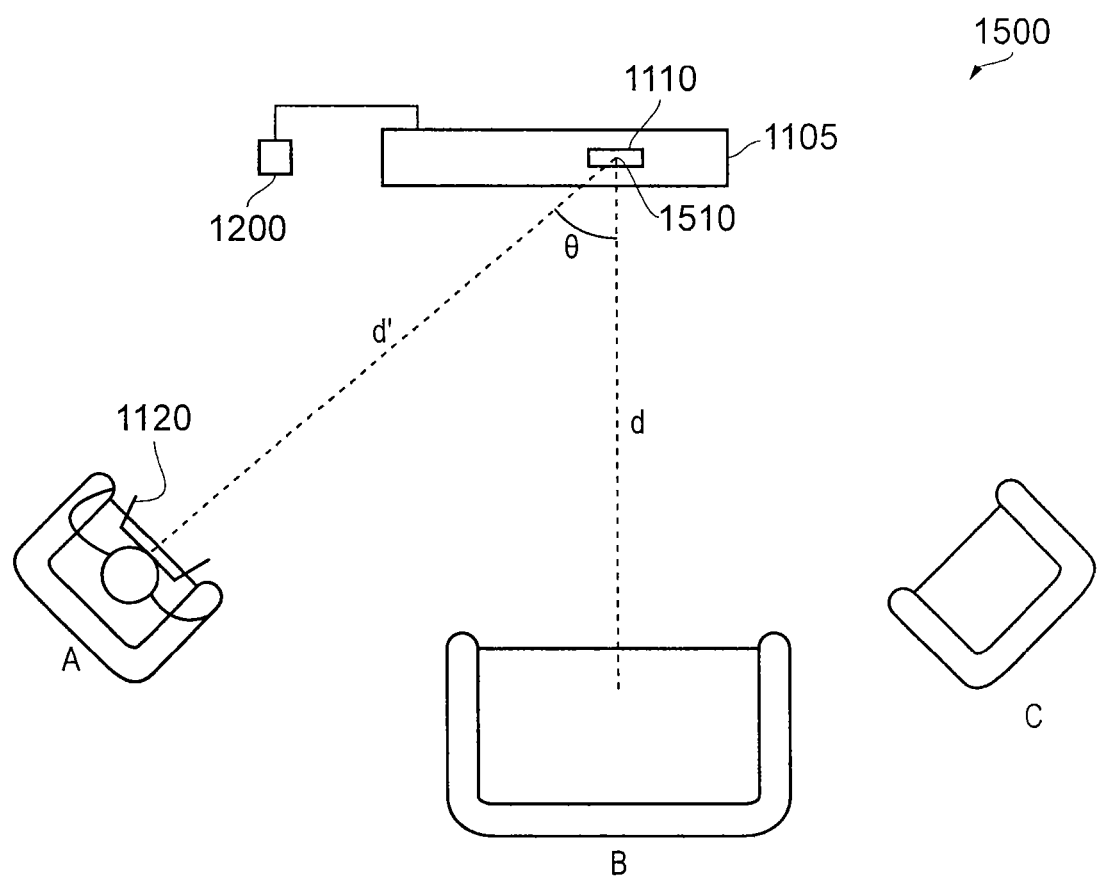
FIG. 15 shows a plan view explaining the process of determining the location of a user.

FIG. 15 shows a plan view 1500 of the room shown in FIG. 2. The user 1120 is sat in position A and the camera 1110 has a reference point 1510. The reference point 1510 is, in embodiments, the centre of the camera 1110. Position B is located d meters in front of the reference point 1510. Position B is located in the centre of the image captured by the camera 1110. The user 1120 is located at position A which is a distance d' from the reference point 1510. Additionally, position A is at an angle θ° from reference point 1510.

In order to determine the location of the user 1120, the d' is calculated by the following method. The user, when wanting to activate the system, looks directly at the camera 1110 and performs some other action identified above. The camera 1110 captures the image of the room, and the device 1200 determines the size of the user's face in the image. By knowing the size of the face of the user in the image, it is possible to compare the determined face size with a typical user's face size at the reference point 1510. For example, if the user profile contains information such as gender or age of the user, then an appropriate average face size for a typical user is known. In other words, the device 1200 knows what size of face a typical user would have if located at the reference point 1510.

The captured face size is therefore assumed to be the size of the face of a typical user at the distance d' from the reference point 1510. Therefore, it is possible to calculate d' as would be appreciated.

In order to determine the angle θ°, the device 1200 determines from the captured image the horizontal offset of the user 1120 from the centre of the image. As it is possible to determine the value of d' and the horizontal offset in the image, it is possible to determine angle θ° using trigonometry. Therefore, it is possible to determine the absolute position of the user 1120.

The accuracy of this process can be further improved if the user holds a calibrated disk next to his or her face when capturing the profile picture. In particular, if the user holds a disk of known size and colour next to their face when capturing the profile picture, the device 1200 knows the size of the user's face at reference position 1510. Then when the user activates the device 1200 when sat in position A, the distance d' may be calculated more accurately as the device 1200 is not assuming the user has a typically average sized face.

Although mechanisms for determining the absolute position of the user is disclosed with reference to FIG. 15, other mechanisms exist for determining the absolute position of a user in a scene from an image. For example, the Sony® Playstation Move® has the ability to determine the position of a user in an image. If the user calibrates the system at a predetermined position in the room, then the Sony® Playstation Move® can determine the absolute position of the user in the room. Additionally, the camera 1110 may also contain an Infra-Red distance sensor that can detect the distance between the camera and objects located in the room. In this case, it would not be necessary to determine the size of the user's face in order to determine their absolute position in the room.

Obviously, numerous modifications and variations of the present disclosure are possible in light of the above teachings. It is therefore to be understood that within the scope of the appended claims, the disclosure may be practiced otherwise than as specifically described herein.

In so far as embodiments of the disclosure have been described as being implemented, at least in part, by software-controlled data processing apparatus, it will be appreciated that a non-transitory machine-readable medium carrying such software, such as an optical disk, a magnetic disk, semiconductor memory or the like, is also considered to represent an embodiment of the present disclosure.

CROSS REFERENCE TO RELATED APPLICATION

The present application claims priority to United Kingdom patent application No GB1218826.4, filed in the UKIPO on 19 Oct. 2012, the entire contents of which being incorporated herein by reference.

The invention claimed is:
1. A directional sound apparatus, comprising
 a receiver circuitry configured to receive audio data associated with a video stream and to receive, over a network, ancillary audio data containing supplemental audio data associated with the video stream;
 a storage device circuitry configured to store a plurality of profiles, each profile being associated with a different user of the directional sound apparatus and defining audio providable to a user;

a location device circuitry configured to define a first positional location of a first user having a stored profile;
an audio output circuitry configured to connect to a plurality of speakers; and
an audio controller circuitry configured to control audio output to the plurality of speakers to simultaneously provide the audio data and the supplemental audio data to the first user at the first positional location and said audio data to a second user located at a second, different, positional location.

2. A directional sound apparatus according to claim 1, wherein the storage device circuitry is configured to store a face image with each profile and the location device circuitry is operable to be connected to a camera, wherein the location device circuitry is configured to receive a captured image including a face of the first user from the camera and the location device circuitry is further configured to detect the face of the first user in the captured image and to define the first positional information based upon a position of the detected face of the first user.

3. A directional sound apparatus according to claim 2, wherein a stored face image of the first user is stored in association with at least one parameter of the camera and reference positional information defining a position of the first user when the stored face image was captured.

4. A directional sound apparatus according to claim 1, wherein the supplemental audio data is an audio descriptor or contains dialogue in a language different to the dialogue in the audio data.

5. A directional sound apparatus according to claim 2, wherein the location device circuitry is configured to detect from the captured image a physical action performed by the first user, a performance of the physical action indicating that the audio controller circuitry should commence control of the audio output to the plurality of speakers.

6. A directional sound apparatus according to claim 5, wherein the location device circuitry is configured to monitor an area in the captured image surrounding the detected physical action, and in response to a further physical action, the audio controller circuitry is configured to provide an audio signal to both the first and second user.

7. A directional sound apparatus according to claim 1, comprising a user input device circuitry configured to receive a user profile for storage in the storage device.

8. A directional sound apparatus according to claim 1, wherein the location device circuitry is configured at registration of the user with the directional sound apparatus, to determine a positional location of the user being registered, and the storage device circuitry is configured to store the positional location of the user being registered in association with a user profile being registered.

9. A graphical user interface for a directional sound apparatus according to claim 1, the graphical user interface being displayable on a screen and comprising: a display region defining a plurality of accessibility options, wherein the user selects one or more of the displayed accessibility options and, in response to the user selection, the storage device circuitry is configured to store the selected accessibility option in association with a user profile.

10. A user profile generating device, comprising an input device circuitry configured to receive voice commands from a user; an output device operable to provide audible instructions to the user, and a memory circuitry configured to store a user profile, wherein the memory circuitry is configured to store a plurality of accessibility options and the output device circuitry is configured to audibly present each of the plurality of accessibility options, and an accessibility option is associated with the user profile upon receipt of a voice command from the user.

11. A method, comprising
receiving audio data associated with a video stream;
receiving, over a network, ancillary audio data containing supplemental audio data associated with the video stream;
storing a plurality of profiles, each profile being associated with a different user of a directional sound apparatus and defining audio providable to a user;
defining a first positional location of a first user having a stored profile;
controlling audio output to a plurality of speakers to simultaneously provide the audio data and the supplemental audio data to the first user at the first positional location and said audio data to a second user located at a second, different, positional location.

12. A method according to claim 11, comprising storing a face image with each profile; receiving a captured image including a face of the first user from a camera and detecting the face of the first user in the captured image and defining the first positional information based upon a position of the detected face of the first user.

13. A method according to claim 12, wherein a stored face image of the first user is stored in association with at least one parameter of the camera and reference positional information defining a position of the first user when the stored face image was captured.

14. A method according to claim 11, wherein the supplemental audio data is an audio descriptor or contains dialogue in a language different to the dialogue in the audio data.

15. A method according to claim 12, comprising detecting from the captured image a physical action performed by the first user, a performance of the physical action indicating that control should commence of the audio output to the plurality of speakers.

16. A method according to claim 15, comprising monitoring an area in the captured image surrounding the detected physical action, and in response to a further physical action; and providing an audio signal to both the first and second user.

17. A method according to claim 11, comprising receiving a user profile for storage in the storage device.

18. A method according to claim 11, comprising determining, at registration of the user with the directional sound apparatus, a positional location of the user being registered, and storing the positional location of the user being registered in association with a user profile being registered.

19. A computer program comprising computer readable instructions which, when loaded onto a computer, configure the computer to perform the method according to claim 11.

20. A non-transitory computer readable storage medium configured to store the computer program of claim 19 therein or thereon.

* * * * *